(12) United States Patent
Meade et al.

(10) Patent No.: US 12,006,039 B2
(45) Date of Patent: Jun. 11, 2024

(54) MATERIAL DELIVERY SYSTEMS AND METHODS

(71) Applicant: FMC CORPORATION, Philadelphia, PA (US)

(72) Inventors: Darryl A. Meade, Chesapeake City, MD (US); Edward Lang, Wilmington, DE (US); Xuan Li, Wilmington, DE (US); Maggie Lynch, Elkton, MD (US)

(73) Assignee: FMC Corporation, Philadelphia, PA (US)

( * ) Notice: Subject to any disclaimer, the term of this patent is extended or adjusted under 35 U.S.C. 154(b) by 179 days.

(21) Appl. No.: 17/634,988

(22) PCT Filed: Aug. 13, 2020

(86) PCT No.: PCT/US2020/046088
§ 371 (c)(1),
(2) Date: Feb. 13, 2022

(87) PCT Pub. No.: WO2021/030540
PCT Pub. Date: Feb. 18, 2021

(65) Prior Publication Data
US 2022/0324564 A1   Oct. 13, 2022

Related U.S. Application Data

(60) Provisional application No. 62/885,978, filed on Aug. 13, 2019.

(51) Int. Cl.
*B64C 39/02* (2023.01)
*B64D 1/18* (2006.01)
(Continued)

(52) U.S. Cl.
CPC .............. *B64C 39/024* (2013.01); *B64D 1/18* (2013.01); *B65D 83/0055* (2013.01); *B64U 2101/60* (2023.01); *B64U 2201/20* (2023.01)

(58) Field of Classification Search
CPC .. B64D 1/18; B64U 2101/00; B64U 2101/40; B64U 2101/45
See application file for complete search history.

(56) References Cited

U.S. PATENT DOCUMENTS

2018/0064049 A1   3/2018   Cantrell et al.
2018/0064094 A1   3/2018   Cantrell et al.
(Continued)

FOREIGN PATENT DOCUMENTS

CN   104542079 A   4/2015
CN   107426988 A   12/2017
(Continued)

OTHER PUBLICATIONS

International Search Report of corresponding PCT application PCT/US2020/046088.

*Primary Examiner* — Richard G Davis
(74) *Attorney, Agent, or Firm* — FMC Corporation

(57) ABSTRACT

Described herein is an aerial material delivery system, which includes an unmanned aerial vehicle (UAV) including a body, and a material dispensing system mounted to the UAV. The delivery system also includes a collapsible storage container releasably mountable to the UAV. The storage container contains a flowable chemical product and includes at least one coupler adapted to couple the storage container to the material dispensing system of the UAV and allow the flowable chemical product to be dispensed therethrough.

19 Claims, 21 Drawing Sheets

(51) Int. Cl.
 B65D 83/00 (2006.01)
 *B64U 101/60* (2023.01)

(56) References Cited

U.S. PATENT DOCUMENTS

| | | |
|---|---|---|
| 2018/0065747 A1 | 3/2018 | Cantrell et al. |
| 2018/0065749 A1 | 3/2018 | Cantrell et al. |
| 2018/0068164 A1 | 3/2018 | Cantrell et al. |
| 2018/0068165 A1 | 3/2018 | Cantrell et al. |
| 2019/0239500 A1 | 8/2019 | Barker et al. |
| 2019/0389577 A1* | 12/2019 | Jones .................. G05D 1/0088 |

FOREIGN PATENT DOCUMENTS

| | | | | |
|---|---|---|---|---|
| CN | 107867400 A | * | 4/2018 | .......... A01M 7/0089 |
| CN | 108013014 A | | 5/2018 | |
| CN | 108244089 A | * | 7/2018 | |
| CN | 108244089 A | | 7/2018 | |
| CN | 108935396 A | * | 12/2018 | |
| CN | 108935396 A | | 12/2018 | |
| CN | 108013014 B | * | 6/2021 | .......... A01M 7/0085 |

\* cited by examiner

```
                                 ┌─ 1000

┌─ 1002
┌─────────────────────────────────────────────────┐
│ PROVIDE A COLLAPSIBLE STORAGE CONTAINER THAT    │
│ CONTAINS A FLOWABLE CHEMICAL PRODUCT, THE       │
│ STORAGE CONTAINER INCLUDING AT LEAST ONE        │
│ COUPLER                                         │
└─────────────────────────────────────────────────┘
                        │
                        ▼            ┌─ 1004
┌─────────────────────────────────────────────────┐
│ RELEASABLY MOUNT THE STORAGE CONTAINER TO       │
│ AN UNMANNED AERIAL VEHICLE (UAV)                │
└─────────────────────────────────────────────────┘
                        │
                        ▼            ┌─ 1006
┌─────────────────────────────────────────────────┐
│ COUPLE THE STORAGE CONTAINER TO A MATERIAL      │
│ DISPENSING SYSTEM MOUNTED TO THE UAV USING      │
│ THE AT LEAST ONE COUPLER                        │
└─────────────────────────────────────────────────┘
                        │
                        ▼            ┌─ 1008
┌─────────────────────────────────────────────────┐
│ DISPENSE THE FLOWABLE CHEMICAL PRODUCT FROM     │
│ THE UAV USING THE MATERIAL DISPENSING SYSTEM    │
└─────────────────────────────────────────────────┘
```

FIG. 26

```
                                    ┌─1100
                                  ╱
                                ╱─1102
┌─────────────────────────────────────────────┐
│ INTRODUCE A LIQUID INTO A COLLAPSIBLE LIQUID│
│ STORAGE CONTAINER THAT CONTAINS A PRE-SOSED │
│ AMOUNT OF A CHEMICAL PRODUCT TO FORM A LIQUID│
│ MIXTURE. THE LIQUID STORAGE CONTAINER       │
│ INCLUDING AT LEAST ONE FLUID COUPLER        │
└─────────────────────────────────────────────┘
                       │        ┌─1104
                       ▼
┌─────────────────────────────────────────────┐
│ RELEASABLY MOUNT THE STORAGE CONTAINER TO   │
│ AN UNMANNED AERIAL VEHICLE (UAV)            │
└─────────────────────────────────────────────┘
                       │        ┌─1106
                       ▼
┌─────────────────────────────────────────────┐
│ COUPLE THE STORAGE CONTAINER TO A LIQUID    │
│ DISPENSING SYSTEM MOUNTED TO THE UAV USING  │
│ THE AT LEAST ONE FLUID COUPLER              │
└─────────────────────────────────────────────┘
                       │        ┌─1108
                       ▼
┌─────────────────────────────────────────────┐
│ DISPENSE THE LIQUID MIXTURE FROM THE UAV    │
│ USING THE LIQUID DISPENSING SYSTEM          │
└─────────────────────────────────────────────┘
```

FIG. 27

MATERIAL DELIVERY SYSTEMS AND METHODS

CROSS-REFERENCE TO RELATED APPLICATION

This application claims the benefit of U.S. Provisional Application No. 62/885,978 filed Aug. 13, 2019.

BACKGROUND

This disclosure is directed to material delivery systems, and more specifically to material delivery systems and methods for dispensing flowable chemical products.

Use of drones or unmanned aerial vehicles (UAVs) in agricultural applications, such as for treating fields with chemical products, is rapidly expanding. A container of chemical products is coupled to the UAV and a material dispensing system mounted to the UAV, and the UAV is piloted above the area to be treated while the chemical product is dispensed. Many of the containers are constructed from rigid materials that have significant weight. Moreover, filling and refilling these containers with chemical products may be difficult and hazardous.

A need exists for a chemical container that is lightweight, which would conserve power expended by the UAV and improve the run-time of the UAV. Moreover, a need exists for a container that already contains the chemicals therein, to improve ease of use and decrease risk.

BRIEF DESCRIPTION

In one aspect, an aerial chemical delivery system is provided. The aerial chemical delivery system includes an unmanned aerial vehicle (UAV) including a body, a material dispensing system mounted to the UAV, and a collapsible storage container releasably mountable to the UAV. The storage container contains a flowable chemical product and includes at least one coupler adapted to couple the storage container to the material dispensing system of the UAV and allow the flowable chemical product to be dispensed therethrough.

In another aspect, a method is provided. The method includes providing a collapsible storage container that contains a flowable chemical product. The storage container includes at least one coupler. The method also includes releasably mounting the storage container to an unmanned aerial vehicle (UAV), and coupling the storage container to a material dispensing system mounted to the UAV using the at least one coupler. The method further includes dispensing the flowable chemical product from the UAV using the material dispensing system.

In a further aspect, an aerial fluid delivery system is provided. The aerial fluid delivery system includes an unmanned aerial vehicle (UAV) including a body, a liquid dispensing system mounted to the UAV, and a collapsible liquid storage container releasably mountable to the UAV. The liquid storage container contains a pre-dosed amount of a chemical product and includes at least one fluid coupler. The liquid storage container is configured to receive a liquid via the at least one fluid coupler to form a liquid mixture with the chemical product, and the at least one fluid coupler is adapted to fluidly couple the liquid storage container to the liquid dispensing system of the UAV for dispensing the liquid mixture therethrough.

In yet another aspect, a method is provided. The method includes introducing a liquid into a collapsible liquid storage container that contains a pre-dosed amount of a chemical product to form a liquid mixture. The liquid storage container includes at least one fluid coupler. The method also includes releasably mounting the liquid storage container to an unmanned aerial vehicle (UAV), fluidly coupling the liquid storage container to a liquid dispensing system mounted to the UAV using the at least one fluid coupler, and dispensing the liquid mixture from the UAV using the liquid dispensing system.

In a still further aspect, a collapsible liquid storage container is provided. The collapsible liquid storage container includes a flexible sidewall constructed of an ultralightweight material. The sidewall at least partially defines a cavity. The collapsible liquid storage container also includes a pre-dosed amount of a chemical product disposed within the cavity, and at least one mechanical coupler coupled to the sidewall and configured for releasable coupling to an unmanned aerial vehicle (UAV). The collapsible liquid storage container further includes at least one fluid coupler coupled in fluid communication with the cavity. The liquid storage container is configured to receive a liquid into the cavity via the at least one fluid coupler to form a liquid mixture with the chemical product, and the at least one fluid coupler is adapted to fluidly couple the cavity to a liquid dispensing system of the UAV such that the liquid mixture can be dispensed from the UAV liquid dispensing system.

In a yet another aspect, a liquid chemical delivery system is provided. The liquid chemical delivery system includes a backpack assembly including at least one shoulder strap, a frame coupled to the backpack assembly, a liquid dispensing system coupled to the backpack assembly, and a collapsible liquid storage container releasably mountable to the frame. The liquid storage container contains a pre-dosed amount of a chemical product and includes at least one fluid coupler. The liquid storage container is configured to receive a liquid via the at least one fluid coupler to form a liquid mixture with the chemical product, and the at least one fluid coupler is adapted to fluidly couple the liquid storage container to the liquid dispensing system for dispensing the liquid mixture therethrough.

BRIEF DESCRIPTION OF THE DRAWINGS

FIG. 26 is a flow diagram of a method of using or operating an aerial material delivery system, such as the aerial material delivery system shown in FIGS. 1-5 and/or the aerial material delivery system shown in FIGS. 17 and 18.

FIG. 27 is a flow diagram of another method of using or operating an aerial material delivery system, such as the aerial material delivery system shown in FIGS. 1-5 and/or the aerial material delivery system shown in FIGS. 17 and 18.

DETAILED DESCRIPTION OF THE DISCLOSURE

Figure 1:
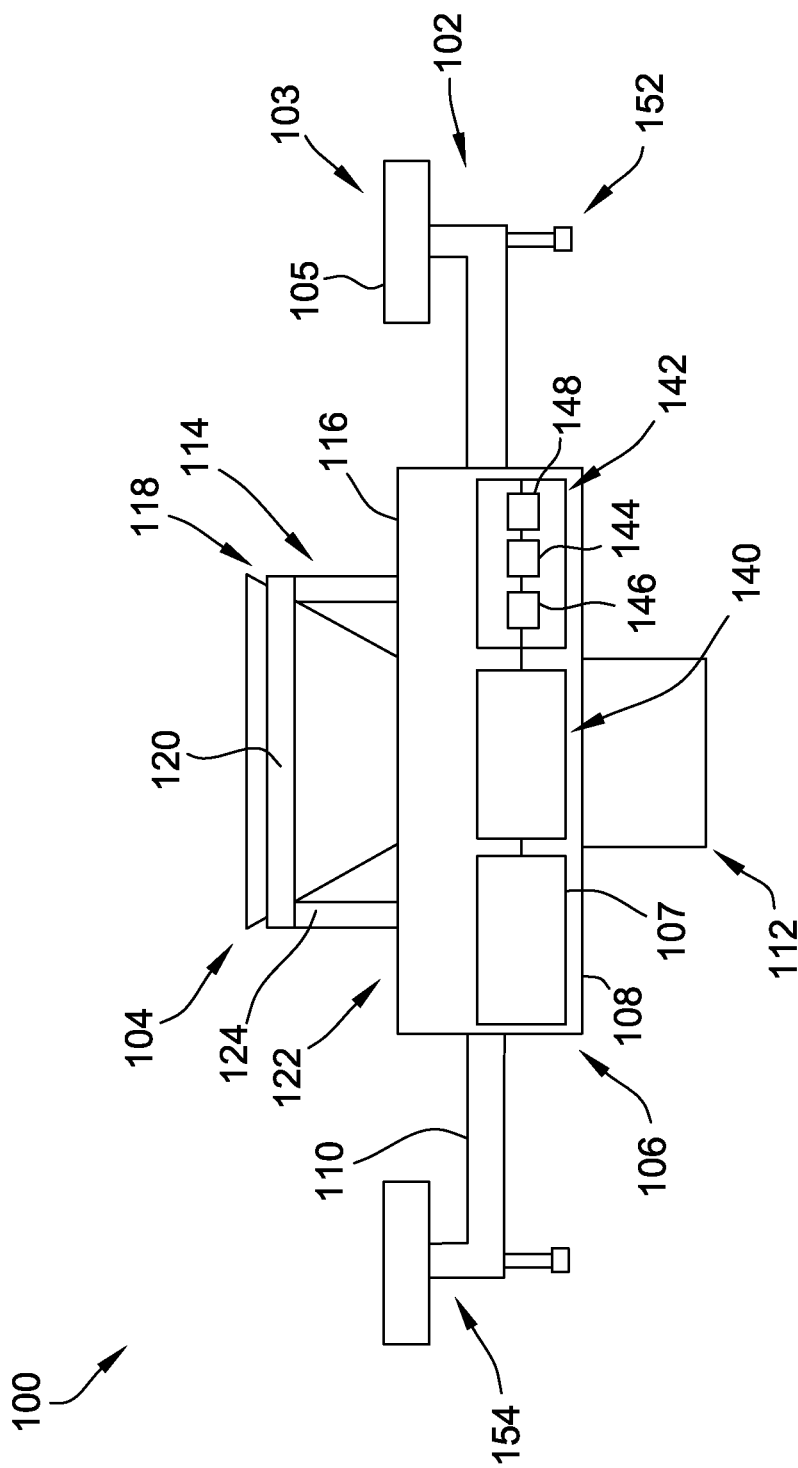
FIG. 1 is a schematic view of an exemplary aerial material delivery system.
Figure 2:
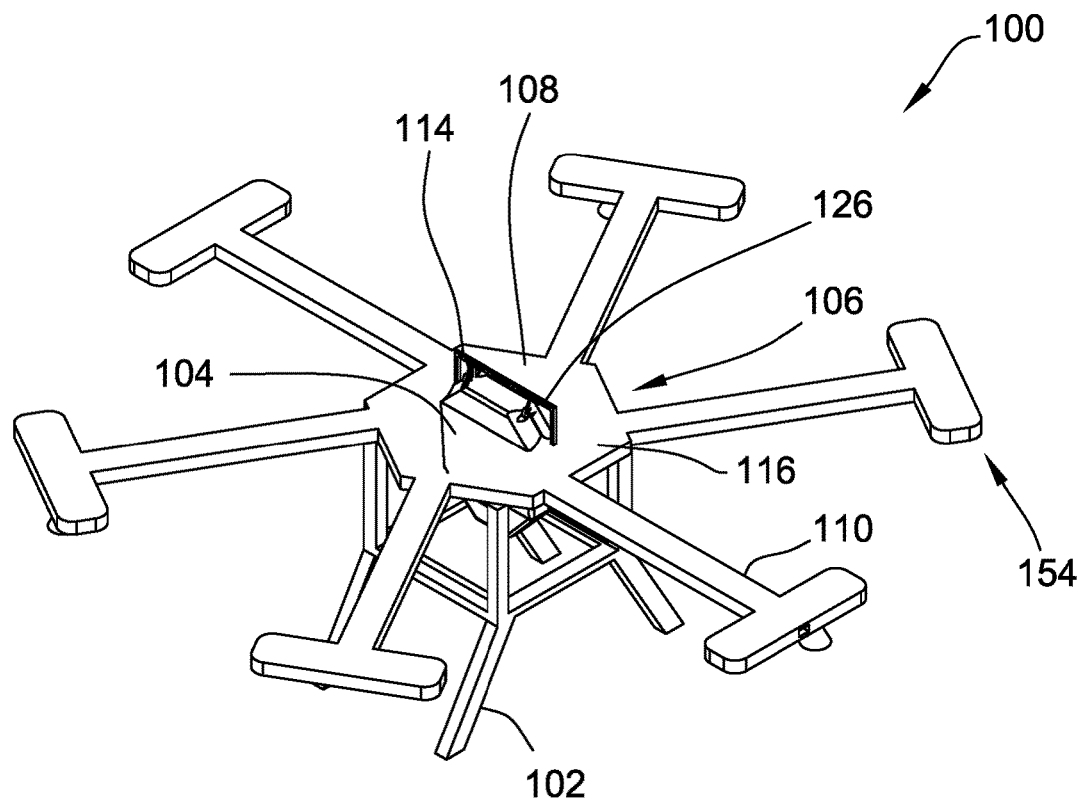
FIG. 2 is a perspective view of an exemplary aerial material delivery system including a liquid dispensing system.

The present disclosure is generally material delivery systems that include chemical storage containers that are releasably connected to the material delivery system. In specific embodiments, the present disclosure is directed to material delivery systems that include a light weight chemical storage container mounted to an unmanned aerial vehicle (UAV) or drone. Specifically, the storage container is a flexible storage container formed of a light weight material, which decreases energy consumption and improves flight duration of the UAV when dispensing chemicals from the storage container. Moreover, the flexibility of the storage container eliminates the need for venting, which simplifies the material delivery system and also reduces the risk of exposure to chemical products therein when handling the storage container. The storage container may be reusable and/or recyclable, to reduce waste. Alternatively, the storage container may be disposable, to reduce the need for system cleanout.

In some embodiments, the storage container is mounted to the UAV using a removable frame, which makes mounting and removal of the storage container simpler and faster, reducing unnecessary downtime. In addition, embodiments of storage containers described herein can be coupled to material delivery systems of UAVs via a snap-fit connection, thereby improving convenience and simplifying use of the material delivery system.

FIGS. 1-5 illustrate an exemplary aerial material or chemical delivery system 100 in accordance with the present disclosure. In the example embodiment, the aerial material delivery system 100 is implemented using an unmanned aerial vehicle (UAV) or drone 102. As used herein, UAV refers generally to any unmanned or remotely piloted vehicle or system. The aerial material delivery system 100 includes the UAV 102 and a collapsible storage container 104 mounted thereto. The storage container 104 includes a flowable chemical material contained therein (not shown in FIGS. 1-5) to be dispensed using the aerial material delivery system 100. As used herein, the term "flowable" refers to materials that are capable of flowing or being flowed when subjected to an applied force, such as gravity or a pump-induced pressure differential, and includes, for example and without limitation, liquids and solids, such as powders and granules.

The UAV 102 includes a body 106 generally defined by a hub 108 and a plurality of spoke-like arms 110. A material dispensing system 112 for dispensing material from the storage container 104 is mounted to the UAV body 106. The material dispensing system 112 may be a liquid material dispensing system or a dry material dispensing system configured to dispense flowable or pourable materials, such as liquids or non-gaseous fluids, granules, and/or powders.

In the example embodiment, the storage container 104 is releasably or removably mounted to the UAV body 106. The aerial material delivery system 100 includes a frame 114 coupled to the UAV body 106 for mounting the storage container 104 to the UAV body 106. In the example embodiment, the frame 114 is coupled to a top 116 of the UAV body 106. In some embodiments, the frame 114 is releasably coupled to the UAV body 106, to facilitate coupling the storage container 104 to the UAV body 106 rapidly and simply (e.g., by coupling the storage container 104 to the frame 114 and coupling the frame 114 to the UAV body 106). Alternatively, the frame 114 is non-releasably or permanently mounted to the UAV body 106.

In the example embodiment, the frame 114 has a generally inverted U-shape and includes a top 118 defined by a top rod 120 and a bottom 122 defined by two leg rods 124, The frame bottom 122 (e.g., the two leg rods 124) is coupled to the UAV body 106, specifically to the top 116 of the UAV body. The frame bottom 122 may be coupled to the top 116 of the UAV body 106 via any suitable coupling mechanism, such as via a snap or friction fit. The frame top 118 extends above the top 116 of the UAV body 106 and provides a mounting location for the storage container 104. In some embodiments, the frame 114 includes one or more mechanical couplers 126 for coupling the storage container 104 thereto. For example, the frame 114 includes hooks (e.g., a pair of hooks) coupled to the top rod 120 and configured to receive the storage container 104. The frame may include any suitable mechanical coupler(s) 126 coupled to any part of the frame 114, such as snaps, buttons, bolts, and like. Moreover, the frame 114 may include one or more holes therein that function as the mechanical coupler(s) 126 (e.g., to receive hooks and the like).

The UAV 102 also includes a propulsion system 103 for generating lift to facilitate flight of the UAV 102. The propulsion system 103 may generally include any suitable propulsion system that enables the UAV 102 to function as described herein. In the illustrated embodiment, the propulsion system 103 is a rotary-wing propulsion system that includes a plurality of rotors 105, which may include variable- or fixed-pitch blades. Although the UAV 102 is shown and described as a rotary-wing UAV, it should be understood that the systems and methods described herein may be implemented on UAVs other than rotary-wing UAVs, including fixed-wing UAVs. In such embodiments, the propulsion system 103 may include propellers in addition to or as an alternative to rotors 105.

The propulsion system 103 also includes one or more motors 107 operatively coupled to the rotors 105 and configured to drive or rotate the rotors in response to a control signal. Although only one motor 107 is illustrated in FIG. 1, it should be understood that the propulsion system 103 may include any suitable number of motors that enable the UAV 102 to function as described herein. In some embodiments, for example, each rotor 105 has a dedicated motor operatively connected thereto for controlling rotation of the respective rotor 105. Moreover, the motors 107 may be any suitable motor that enables the propulsion system 103 to function as described herein, including, for example and without limitation, electric motors and gasoline-powered engines.

To activate the propulsion system 103, a control signal is sent to the motors 107 (e.g., from a controller 142, described further herein). The motors 107 activate the rotors 105, causing the rotors 105 to rotate and generate lift. Control of the UAV 102 may be achieved, for example, by varying the relative speed of each rotor 105, to change the thrust and torque produced thereby. The UAV 102 may include additional components, including one or more sensors (e.g., inertial sensors, gyroscopes, accelerometers, GPS sensors, etc.) and/or imaging devices (e.g., cameras, video recorders).

The aerial material delivery system 100 further includes a power source 140 operatively coupled to the UAV body 106 and configured to provide power to the UAV 102 (e.g., to the motors 107, the controller 142, etc.) and/or the material dispensing system 112 to perform the functions described herein (e.g., flying, dispensing material, etc.). In the example embodiment, the power source 140 includes a battery, which should be understood to include a single battery, multiple batteries, a battery pack, and the like.

In addition, the UAV 102 includes an on-board controller or computer 142 coupled in operative control communication with various components of the aerial material delivery system 100 (e.g., the UAV 102 and the material dispensing system 112) and facilitating various electronic and/or automatic control thereof. For example, the controller 142 is configured to control the UAV 102 and the material dispensing system 112 according to stored or received controls. The controller 142 includes at least one processor 144 for executing instructions. In some embodiments, executable instructions are stored in a memory 146. In some embodiments, the processor includes 144 one or more processing units (e.g., in a multi-core configuration). The memory 146 is any device allowing information such as executable instructions and/or other data to be stored and retrieved. Specifically, in some embodiments, the memory 146 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In some embodiments, the controller 142 is coupled to any component of the aerial material delivery system 100 via a wired and/or a wireless connection. In some embodiments, the controller 142 is configured to facilitate activation and control of the propulsion system 103 to control movement of the UAV 102 along a predetermined (e.g., stored) or controlled (e.g., manually piloted by a user) path, and to facilitate activation and deactivation of the material dispensing system 112 according to stored or received controls. In one example embodiment, the controller 142 is configured to facilitate operating the UAV 102 such that the UAV 102 flies over a field, and operating the material dispensing system 112 to dispense the flowable chemical product contained in the storage container 104 from the UAV 102 while the UAV 102 is flying over the field, such that the flowable chemical product is applied to the field.

Accordingly, the controller 142 may include a communication interface 148, which is communicatively couplable to any component of the aerial material delivery system 100 described herein and/or to a remote device that transmits controls for controlling operation of the aerial material delivery system (e.g., a remote control). In some embodiments, the communication interface 148 includes, for example and without limitation, a wired or wireless network adapter or a wireless data transceiver adapted for communication over a radio link (e.g., narrowband or broadband radio links), a cellular or mobile data network (e.g., 3G, 4G, or 5G network technology), or a BLUETOOTH link.

In the example embodiment, the material dispensing system 112 is a liquid material dispensing system, and includes a plurality of fluid conduits 150 (see FIG. 5) for delivering fluid from the storage container 104 to a respective fluid outlet. In the example embodiment, each fluid conduit 150 extends along a corresponding one of the UAV arms 110 to a respective fluid outlet or nozzle 152 located at the distal or free end 154 of the arm 110. Each fluid conduit 150 is oriented substantially parallel to the corresponding arm 110 to which it is mounted. In some embodiments, the fluid conduit 150 may be positioned within and/or coaxial with the arm 110. In other embodiments, the fluid conduit 150 is mounted on a top or bottom surface (not labeled) of the arm 110. The fluid conduit 150 may include any suitable conduit that enables liquid to flow therethrough, such as flexible or rigid tubing. In one particular embodiment, the fluid conduits are formed from a cross-linked polyethylene material.

In some embodiments, each fluid conduit 150 is fluidly coupled to the storage container 104 via a coupling subsystem (e.g., coupling subsystem 230, shown in FIG. 10), which fluidly couples the liquid material dispensing system 112 to the storage container 104. The coupling subsystem is in fluid communication with the storage container 104, as described further herein. Each nozzle 152 is mounted on or adjacent to the free end 154 of a respective UAV arm 110. The material dispensing system 112 dispenses material from the storage container 104 through the nozzles 152 onto a target (e.g., a field). The nozzles 152 may include any suitable nozzle type, including, for example and without limitation, flat fan, hollow cone, and/or spinning-disk type nozzles.

Figure 6:
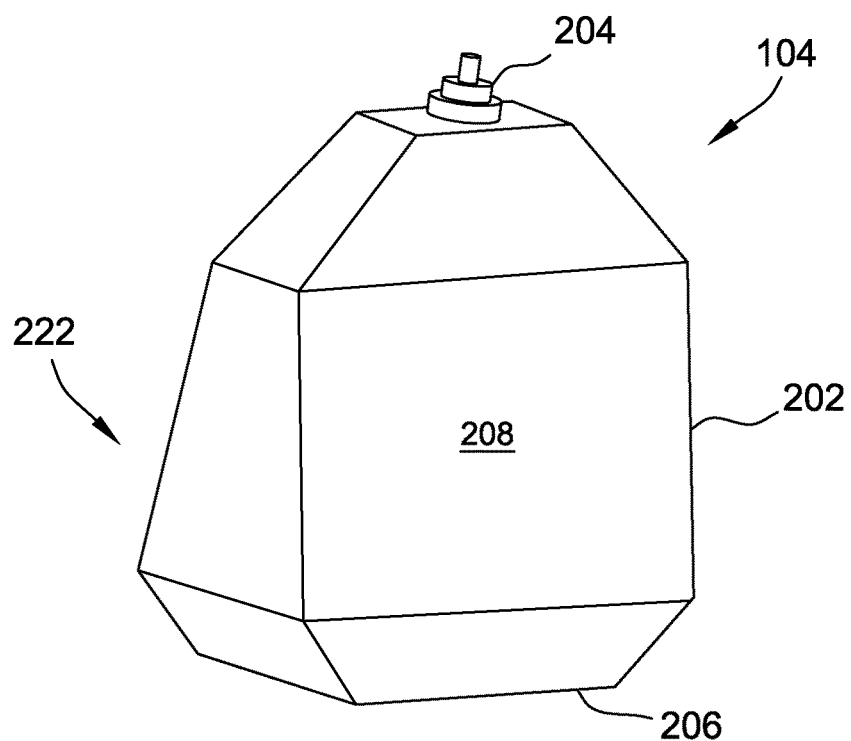
FIG. 6 is a perspective view of an exemplary collapsible storage container suitable for use with the aerial material delivery system shown in FIGS. 1-5.
Figure 7:
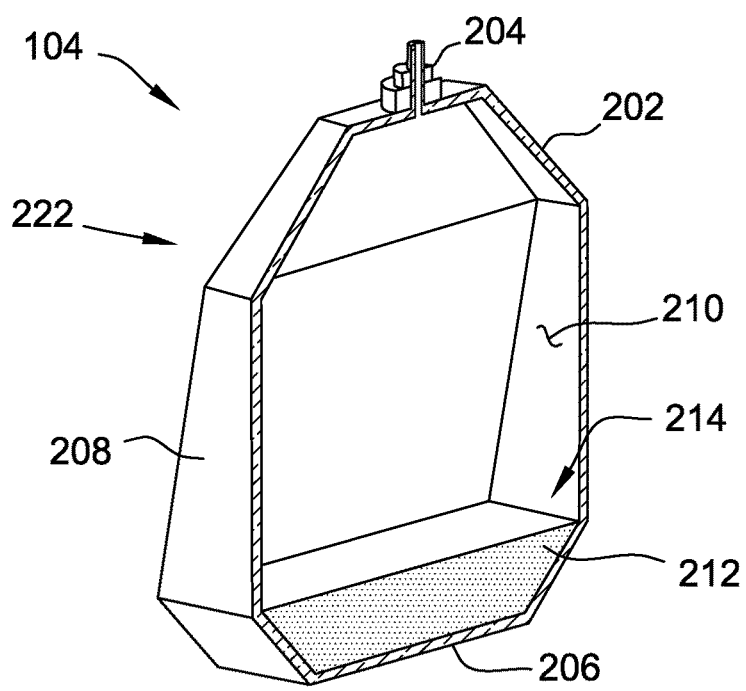
FIG. 7 is a cutaway view of the collapsible storage container shown in FIG. 6, illustrating a flowable chemical product contained therein.

Turning now to FIGS. 6 and 7, the collapsible storage container 104 is shown in greater detail. The collapsible storage container 104 includes a body 202 and a coupler 204 coupled to the body 202. In the example embodiment, the storage container 104 is embodied as a bag, and the body 202 thereof includes a base 206 (e.g., an end of the body 202 opposite the coupler 204) and a flexible sidewall 208 constructed of a flexible material such that the storage container 104 is collapsible. The sidewall 208 may be at least partially translucent or transparent such that the contents of the storage container 104 may be viewed therethrough. Alternatively, the sidewall 208 may be opaque. The sidewall 208 and/or the base 206 (e.g., the body 202 of the storage container 104) may be constructed of a flexible film, such as a flexible film including at least one of plastic, polyethylene (e.g., low-density polyethylene (LDPE)), modified rubber, polyethylene terephthalate, nylon, VALERÓN films (e.g., chemical-resistant VALERÓN films), and/or film laminates. The flexible film may have a thickness from about 3 mil to about 6.5 mil. The flexible material may also be an ultra-lightweight material. As used herein with reference to the storage container 104, the term "ultra-lightweight material" refers to a material that has an areal density of less than 0.15 $g/cm^2$. In some embodiments, the ultra-lightweight material has an areal density of less than 0.1 $g/cm^2$, less than 0.05 $g/cm^2$, or even less than 0.04 $g/cm^2$. In some embodiments, the storage container 104 formed from the ultra-lightweight material is substantially lighter than conventional rigid containers. For example, the storage container 104 has less than 80% of the mass of conventional rigid containers, or less than 75%, or less than 50%, or even less than 30% of the mass of conventional rigid containers. In some embodiments, the flexible material is suitable for reusing and/or recycling. In some embodiments, the sidewall 208 is formed from a thinner or more flexible material than the coupler 204, such that the coupler 204 is more rigid than the sidewall 208. In such embodiments, the sidewall 208 may be constructed of an ultra-lightweight material, while the coupler 204 may be constructed of a non-ultra-lightweight material. Additionally or alternatively, the sidewall 208 may include a thick section adjacent the coupler 204 to provide a suitably rigid area along which the coupler 204 may be coupled to the sidewall 208. In such embodiments, the remainder of the sidewall 208 may be constructed from a relatively thin section, which may be constructed of an ultra-lightweight material. The thick section of the sidewall 208 may be constructed of an ultra-lightweight material or a non-ultra-lightweight material.

In some embodiments, the sidewall 208 is heat-sealed or otherwise sealed such that the sidewall 208 at least partially defines a cavity 210 for containing material to be dispensed by the material dispensing system 112. The storage container 104 contains a flowable chemical product 212, such as a liquid, flowable granules, or flowable powders. In one embodiment, as shown in FIG. 7, the storage container 104 contains a pre-dosed amount 214 of the flowable chemical product 212 disposed within the cavity 210.

The body base 206 further defines the cavity 210 and may be gusseted (see FIGS. 11-16) such that the storage container 104 may remain in an upright position for easier filling, as described further herein. Moreover, the storage container 104 tapers from the base 206 towards the coupler 204 to funnel the flowable chemical product 212 towards the coupler 204, which facilitates more complete emptying of the storage container 104 when the storage container 104 is inverted for dispensing material therefrom, as described further herein.

The coupler 204 is coupled to the flexible sidewall 208 and is in fluid communication with the cavity 210. The coupler 204 facilitates receiving chemical materials and/or mixing materials (e.g., water) therethrough as well as coupling the storage container 104 to the material dispensing system 112. The coupler 204 is coupled to the body 202 of the storage container 104 by a thermal seal. Alternatively, the coupler 204 is coupled to the container body 202 via any suitable connection, such as a threaded connection (e.g., external threads on the body 202 mate with internal threads on the coupler 204), a snap fit, and/or via adhesive. Moreover, in some embodiments, the storage container 104 includes a plurality of couplers 204.

In the example embodiment, the storage container 104 is configured to contain a liquid chemical product 212, and, accordingly, the coupler 204 is a fluid coupler in fluid communication with the cavity 210. In addition, the fluid coupler 204 is a single fluid coupler that functions as both an inlet for receiving liquid 216 into the storage container 104 to mix with the chemical product 212, and an outlet for supplying the mixture 218 (of the liquid 216 and the chemical product 212) to the liquid material dispensing system 112. In an alternative embodiment, the fluid coupler 204 is two separate fluid couplers, one of which functions as an inlet and one of which functions as an outlet.

Figure 8:
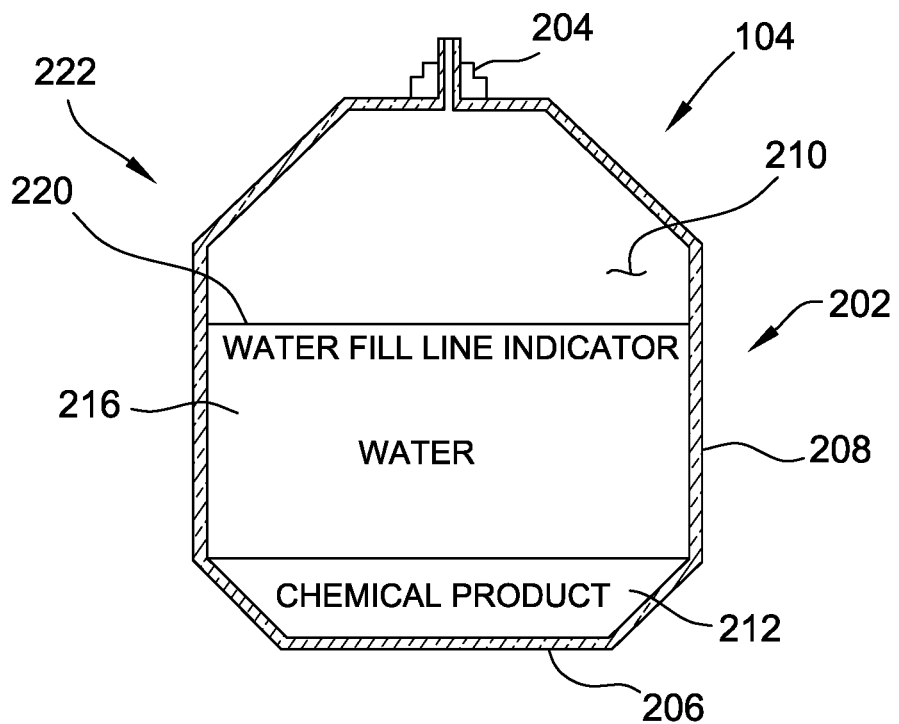
FIG. 8 is a sectional view of the collapsible storage container shown in FIGS. 6 and 7, illustrating the flowable chemical product mixed with liquid.

In the example embodiment, the storage container 104 is configured to receive a liquid 216 (e.g., water) via the fluid coupler 204 to form the liquid mixture 218 with the flowable chemical product 212 contained therein. As shown in FIG. 8, the sidewall 208 includes a fill line indicator 220 that corresponds to a liquid filling level needed to achieve a pre-determined concentration of the liquid mixture 218. A user may introduce liquid 216 (e.g., water) into the cavity 210 of the storage container 104 through the fluid coupler 204 until the liquid mixture 218 (e.g., the water 216 and the pre-dosed amount 214 of the flowable chemical product 212) reaches the fill line indicator 220. In one embodiment, the storage container 104 is configured to receive liquid 216 through the fluid coupler 204 in a filling orientation 222, as shown in FIGS. 6-8. In the filling orientation 222, the fluid coupler 204 is positioned above the container body 202 and is able to receive liquid therethrough under the force of gravity.

Figure 9:
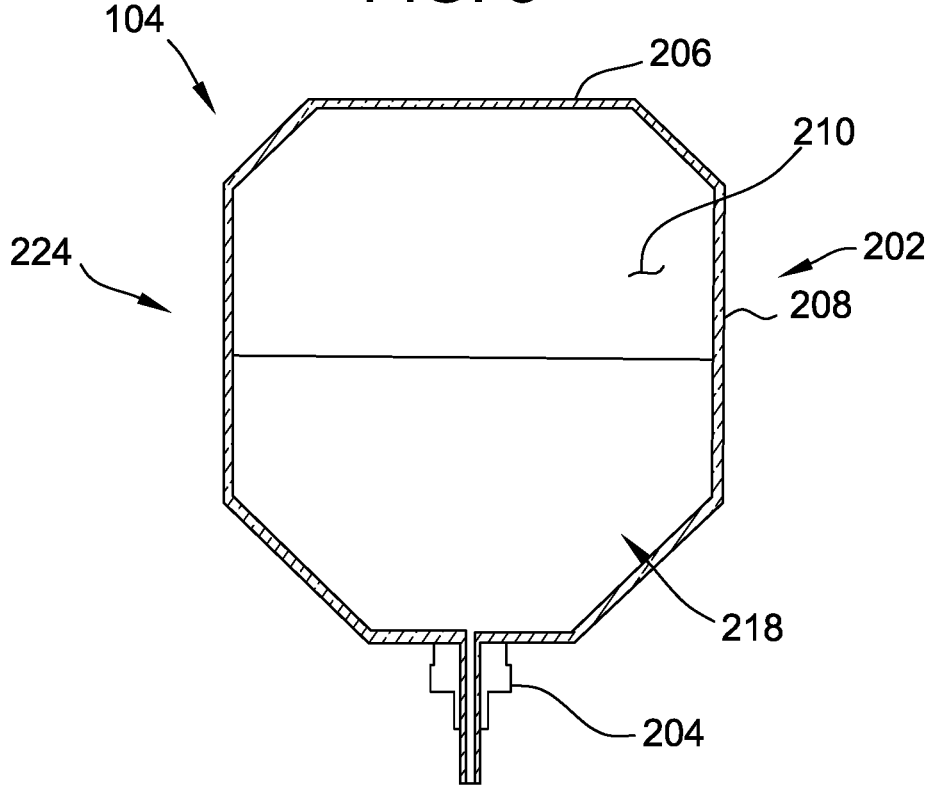
FIG. 9 is another sectional view of the collapsible storage container shown in FIGS. 6-8 in an inverted orientation for coupling to the aerial material delivery system shown in FIGS. 1-5.

In order to dispense liquid (e.g., the liquid mixture 218) from the storage container 104, the storage container 104 is inverted into a dispensing orientation 224, as shown in FIG. 9. In the dispensing orientation 224, the storage container 104 is configured to dispense the liquid mixture 218 through the fluid coupler 204. In the example embodiment, as shown in FIGS. 1-4, the storage container 104 is mounted to the UAV body 106 and coupled to the material dispensing system 112 in the inverted, dispensing orientation 224. In the inverted, dispensing orientation 224, the liquid mixture 218 is dispensed through the fluid coupler 204 and to the material dispensing system 112 under the force of gravity.

Figure 10:
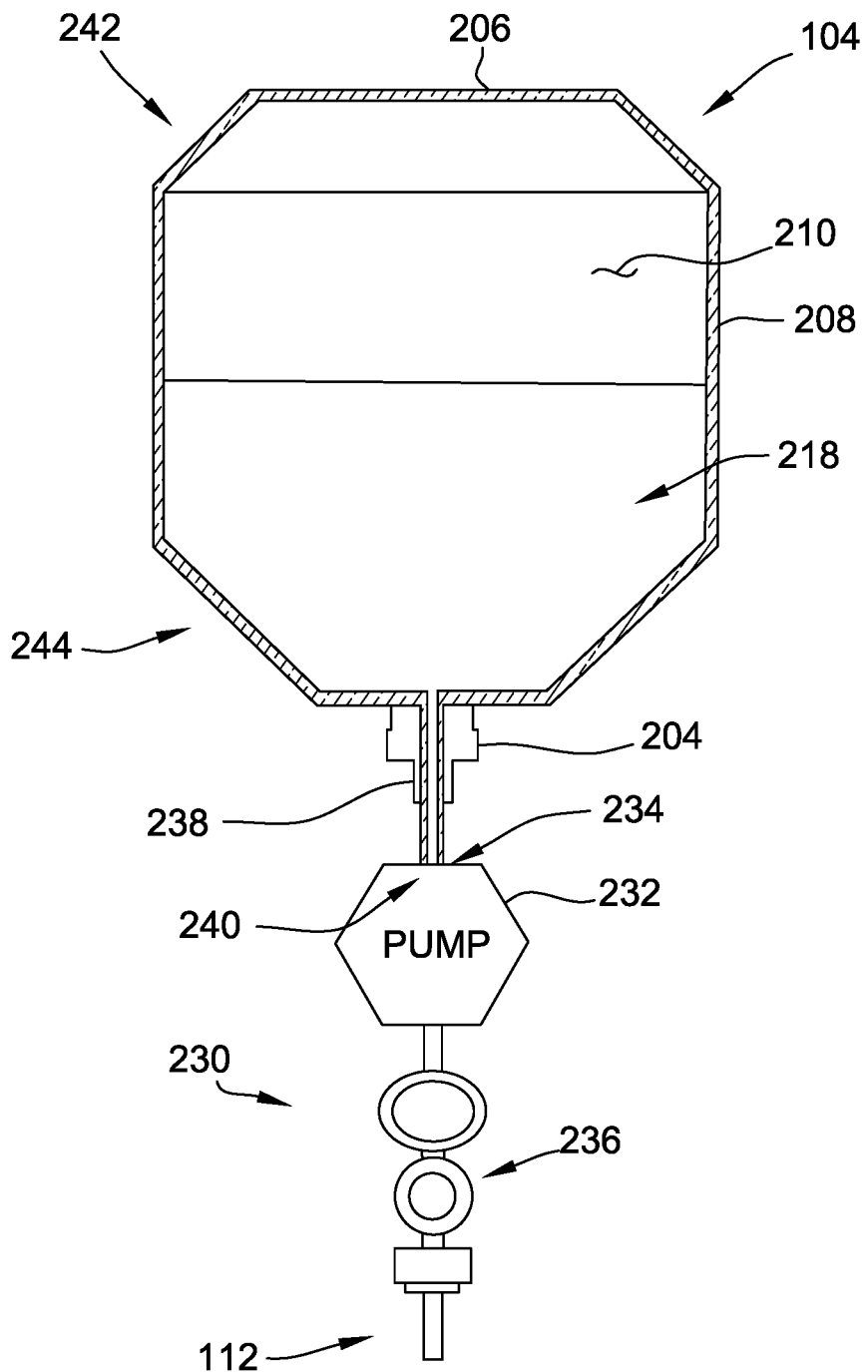
FIG. 10 is a schematic view of the collapsible storage container shown in FIGS. 6-9 coupled to a liquid dispensing system.

FIG. 10 is a schematic diagram of one embodiment of the storage container 104 coupled to the liquid material dispensing system 112. In this embodiment, the material dispensing system 112 includes a coupling subsystem 230 for fluidly coupling the fluid coupler 204 with the fluid conduits 150. The coupling subsystem 230 includes a pump 232, a connector 234, and a check valve 236. The pump 232 is coupled to the fluid coupler 204 and is in fluid communication therewith. The pump 232 is coupled to the fluid coupler 204 via the connector 234, which provides a mechanical connection such as a "quick-connect" connection, threaded connection, a snap fit, a friction fit, and/or any other suitable connection between the pump 232 and the fluid coupler 204.

In the illustrated embodiment, the fluid coupler 204 includes a single outlet 238, and the pump 232 includes a single inlet 240 coupled to the single outlet 238. In an alternative embodiment, the fluid coupler 204 includes a plurality of outlets (e.g., an outlet manifold) and the pump 232 includes a plurality of inlets (e.g., an inlet manifold) coupled to the plurality of outlets. The pump 232 may include any suitable pump adapted to drive the liquid mixture 218 from the storage container 104 through the material dispensing system 112.

The pump 232 is coupled in series with the check valve 236, which is in turn coupled to the fluid conduits 150 (not labeled in FIG. 10). The check valve 236 ensures the liquid material (e.g., the liquid mixture 218) being dispensed is flowing in the correct direction—away from the pump 232 and through the fluid conduits 150. The check valve 236 prevents liquid from flowing back toward the pump 232.

As described above, the storage container 104 is releasably mountable to the UAV body 106 by the frame 114. When the storage container 104 is mounted to the UAV body 106, the storage container 104 is in the inverted, dispensing orientation 224. A "top" 242 of the storage container 104 is located above the top 116 of the UAV body 106, and a "bottom" 244 of the storage container 104 is located below the top 116 of the UAV body 106. In the dispensing orientation 224, the top 242 of the storage container 104 may include the container body base 206 and a portion of the sidewall 208 that is furthest from the fluid coupler 204, and the bottom 244 of the storage container 104 may include the fluid coupler 204 and a portion of the sidewall 208 adjacent thereto.

Figure 3:
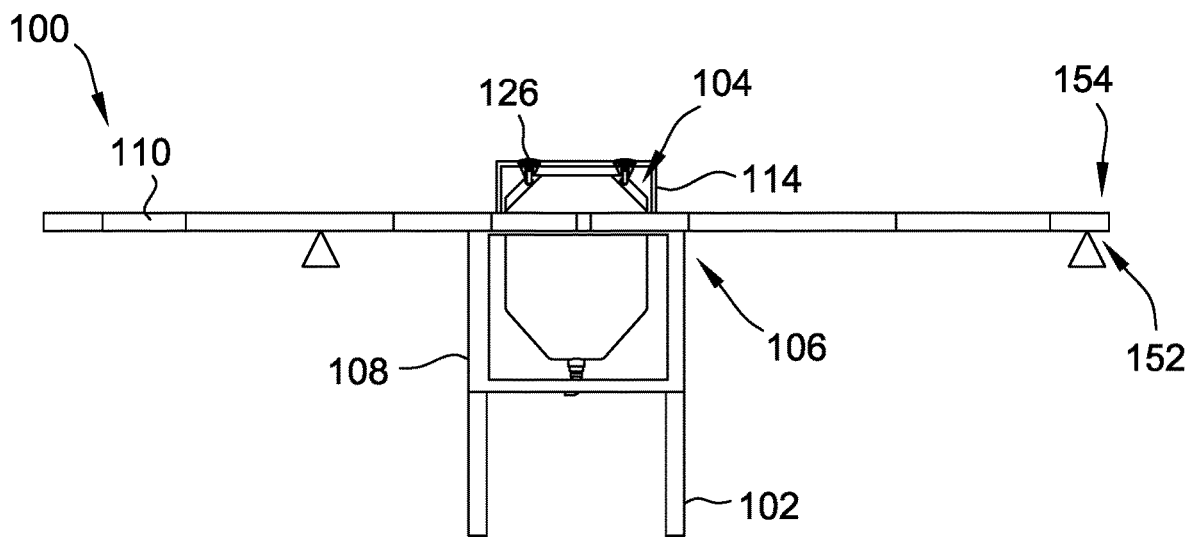
FIG. 3 is a first side view of the aerial material delivery system shown in FIG. 2.
Figure 4:
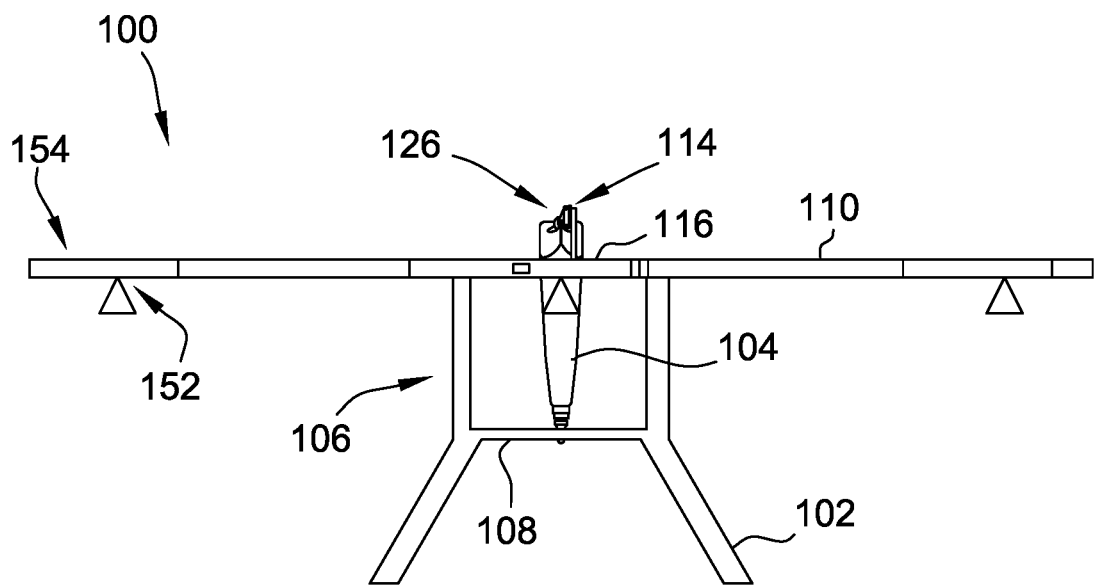
FIG. 4 is a second side view of the aerial material delivery system shown in FIG. 2.
Figure 5:
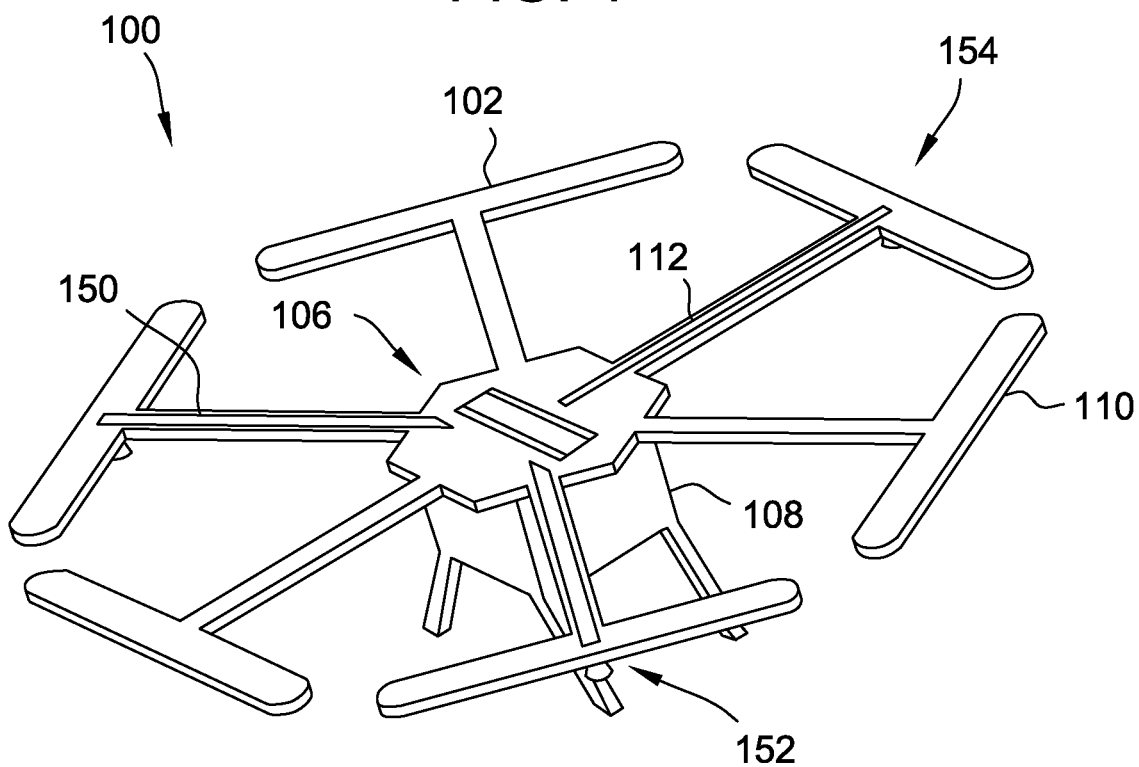
FIG. 5 is another perspective view of the aerial material delivery system shown in FIG. 2.

In operation, the storage container 104 is coupled to the material dispensing system 112 and mounted to the UAV body 106 in the inverted, dispensing orientation 224, with the coupling subsystem 230 positioned below the storage container 104. In the example embodiment, as seen in FIGS. 3 and 4, the fluid coupler 204 of the storage container 104 extends below the UAV body hub 108 when the storage container 104 is mounted to the UAV body 106. In such embodiments, the fluid coupling subsystem 230 is coupled to the fluid coupler 204 external to the UAV body 106. The fluid coupling subsystem 230 may be mounted to the UAV body 106 using one or more fasteners or may hang freely below the UAV body 106 during operation of the aerial material delivery system 100. Alternatively, the coupling subsystem 230 may be enclosed within the UAV body 106.

The liquid material being dispensed (e.g., the liquid mixture 218) is drawn under the force of gravity through the fluid coupler 204 and into the pump 232. Moreover, the pump 232 may not require priming as the pump 232 is positioned below the storage container 104. The pump 232 pumps the material from the storage container 104, through the check valve 236, and through the fluid conduits 150 to be dispensed through the nozzles 152. In the example embodiment, because the storage container 104 is formed from a flexible material, the storage container 104 collapses as the material therein is dispensed through the material dispensing system 112. Therefore, the storage container 104 does not require vent openings. In particular, the storage container 104 is fully closed but for the fluid coupler 204, which reduces the likelihood of material being improperly or inadvertently dispensed from the storage container 104.

In an alternative embodiment, the storage container 104 is provided with an additional port (not shown) defined in a surface opposite the fluid coupler (e.g., in the base 206 of the storage container 104). This port is couplable to an external pump (not shown) that is configured to pump air (or another material) into the storage container 104 to pressurize the cavity 210. In such embodiments, the material in the cavity 210 may be dispensed from the pressurized storage container 104 without the aid of a pump (e.g., pump 232).

In alternative embodiments, the aerial material delivery system 100 includes a plurality of storage containers 104 and, as such, is configured to dispense a plurality of materials therefrom (which may include different materials or the same material), in such embodiments, the aerial material delivery system 100 may include a respective plurality of material dispensing systems 112 and/or a single material dispensing system 112 coupled to the plurality of storage containers 104 (e.g., using a respective plurality of fluid coupling subsystems 230).

In an alternative embodiment, as described in further detail herein, the material dispensing system 112 is a dry material dispensing system configured to dispense, for example, flowable granules and/or flowable powders. In such an embodiment, the material dispensing system 112 includes at least one material spreader, such as a horizontal spreader or a vertical spreader. The spreader may include, for example, a rotary-type spreader coupled to a bottom of the UAV body 106 (in the case of a horizontal spreader) or to a side of the UAV body hub 108 (in the case of a vertical spreader). The spreader may include a coupler adapted for coupling to the coupler 204 of the storage container 104, such that the storage container 104 may dispense flowable granules and/or flowable powders through the couplers into the spreader.

Figure 11:
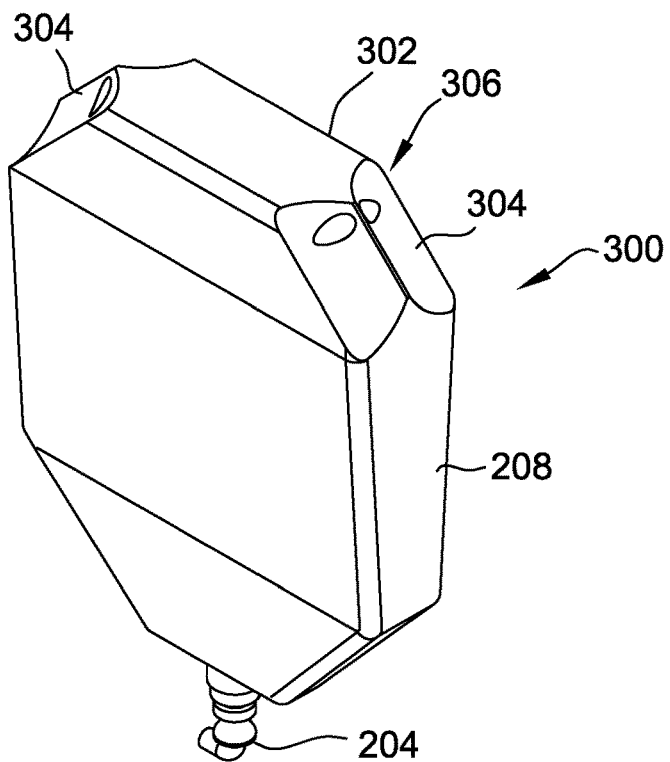
FIGS. 11 and 12 are perspective and side views, respectively, of an additional embodiment of a collapsible liquid storage container suitable for use with the aerial material delivery system shown in FIGS. 1-5.
Figure 12:
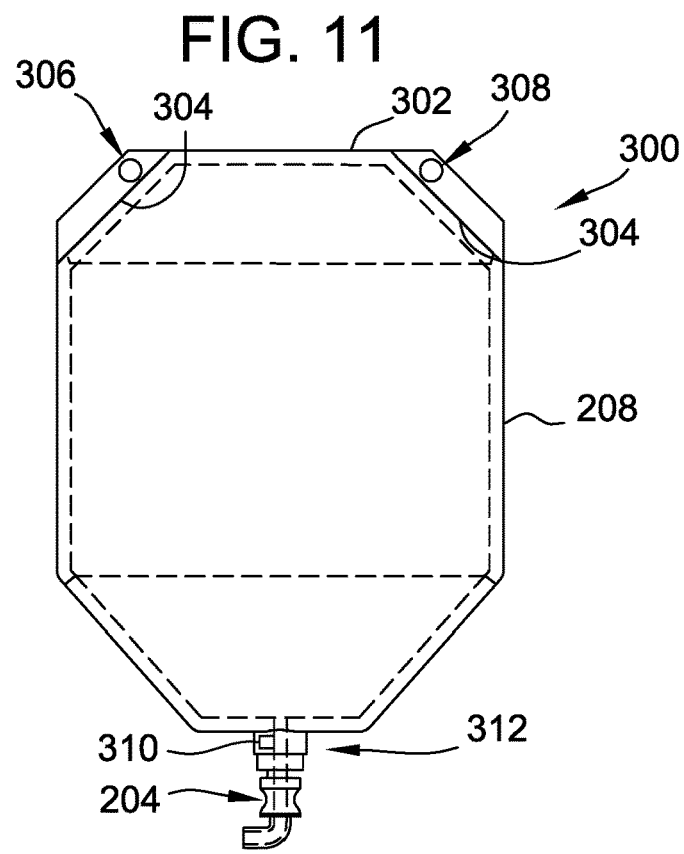

FIGS. 11 and 12 are perspective and side views, respectively, of an additional embodiment of a collapsible liquid storage container 300 suitable for use with the aerial material dispensing system 100 shown in FIGS. 1-5. The storage container 300 is substantially similar to the storage container 104 shown in FIGS. 6-10. The storage container 300 includes a gusseted base 302 having two gussets 304 at opposite ends thereof.

In the example embodiment, the storage container includes at least one mechanical coupler 306 coupled to the sidewall 208 and configured for releasable coupling to the UAV 102—for example, to the frame 114 mounted on the UAV body 106. The mechanical coupler 306 of the storage container 104 is releasably couplable to the frame 114. Where the frame 114 includes mechanical coupler(s) 136 as well, the storage container 104 is releasably couplable to the mechanical coupler(s) 136 of the frame 114. The at least one mechanical coupler 306 of the storage container 104 may include, for example and without limitation, grommets, hooks, buttons, snaps, clips, clamps, and/or bolts. In the example embodiment, the mechanical coupler 306 includes a pair of grommets 308 extending through the sidewall 208 at the gussets 304 and configured for coupling to the mechanical coupler 136 (e.g., the pair of hooks) on the frame 114.

In addition, one or more portions of the storage container 300 may include a unique identifier tag 310 that facilitates identification of a type and/or amount of the material (e.g., the pre-dosed amount 214 of the chemical material 212)

contained within the storage container 300. The identifier tag 310 may include, for example, a radio frequency identifier (RFD) tag. The identifier tag 310 may be integrated into the body 202 of the storage container 300, the fluid coupler 204 coupled to the storage container 300, and/or into a separate cap (not specifically shown) configured to seal the storage container 300 prior to use thereof (e.g., during transportation and/or storage of the storage container 300). In the illustrated embodiment, the identifier tag 310 is integrated into the fluid coupler 204. In particular, the identifier tag 310 is integrated into a threaded portion 312 of the fluid coupler 204 that threadably couples to the storage container 300.

The identifier tag 310 is configured to wirelessly communicate with a tag reader (not shown in FIGS. 11 and 12) configured to read the identifying information from the identifier tag 310. The tag reader may be integrated into the UAV body 106, the controller 142, the fluid coupler 204, or a component of the coupling subsystem 230 (e.g., the connector 234). Additionally or alternatively, the tag reader may be part of a separate device used to read the identifier tag (e.g., a handheld tag reader, not shown). The tag reader may include, for example, an RFID reader.

Figure 13:
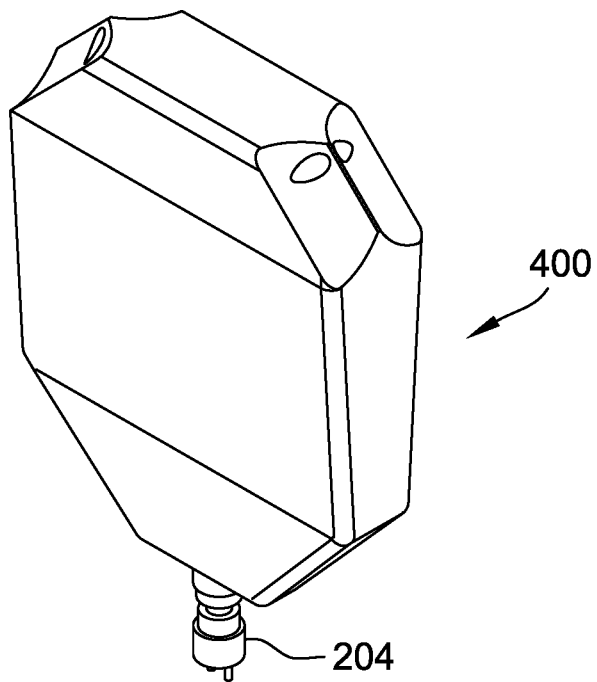
FIGS. 13 and 14 are perspective and side views, respectively, of another embodiment of a collapsible liquid storage container suitable for use with the aerial material delivery system shown in FIGS. 1-5.
Figure 14:
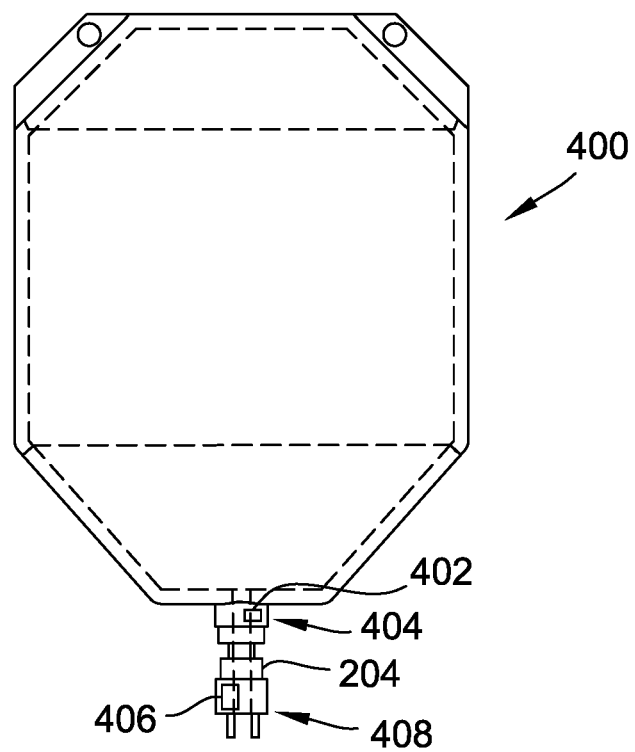

FIGS. 13 and 14 are perspective and side views, respectively, of another embodiment of a collapsible liquid storage container 400 suitable for use with the aerial material dispensing system 100 shown in FIGS. 1-5. The storage container 400 is substantially identical to the storage container 300 shown in FIGS. 11 and 12. For example, the storage container 400 includes a unique identifier tag 402 integrated into the fluid coupler 204. Specifically, the identifier tag 402 is integrated into a threaded portion 404 of the fluid coupler 204 that threadably couples to the storage container 400. Additionally, in the embodiment, illustrated in FIGS. 13 and 14, a tag reader 406 is integrated into the fluid coupler 204. Specifically, the tag reader 406 is integrated into an outlet portion 408 of the fluid coupler 204 that couples to the material dispensing system 112 (e.g., to the inlet 240 of the pump 232).

Figure 15:
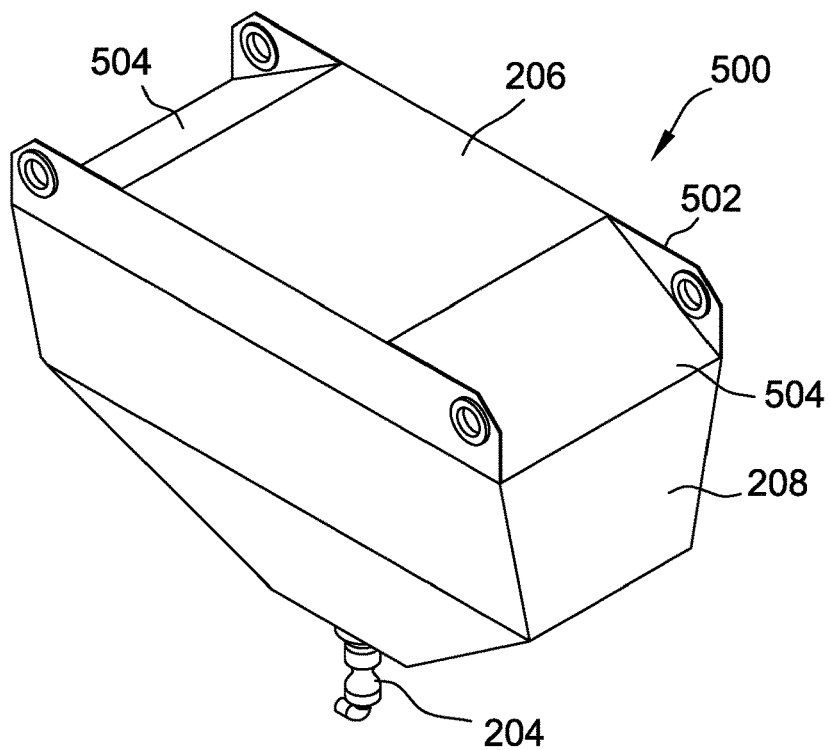
FIGS. 15 and 16 are perspective and side views, respectively, of yet another embodiment of a collapsible liquid storage container suitable for use with the aerial material delivery system shown in FIGS. 1-5.
Figure 16:
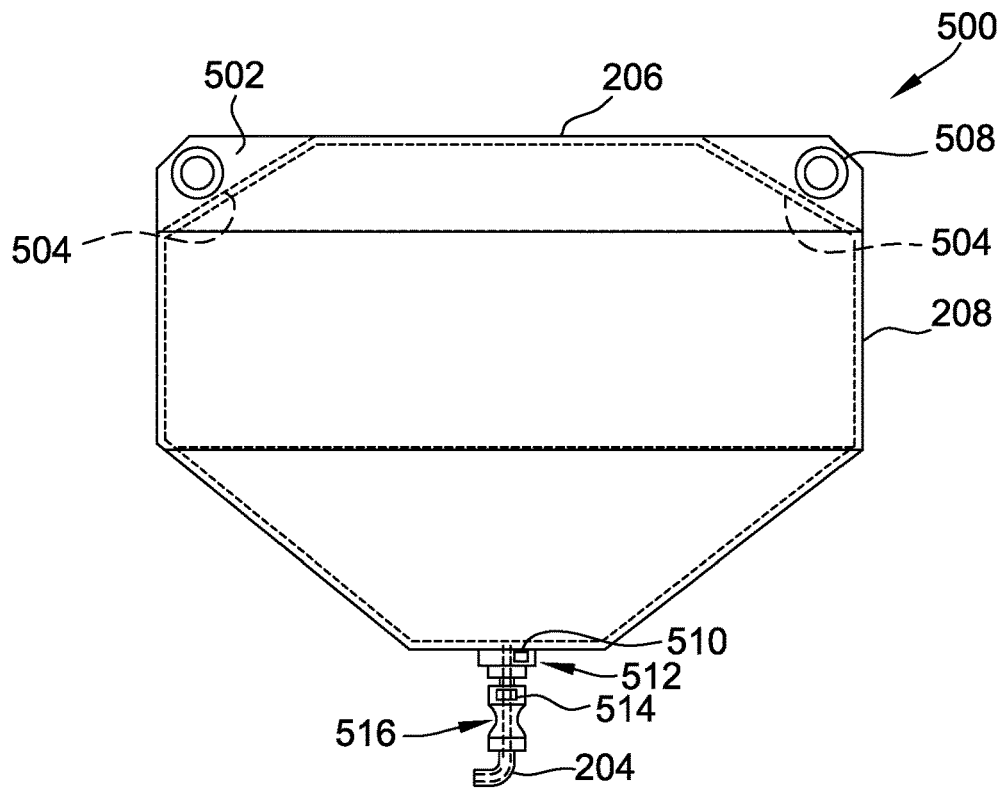

FIGS. 15 and 16 are perspective and side views, respectively, of yet another embodiment of a collapsible liquid storage container 500 suitable for use with the aerial material dispensing system 100 shown in FIGS. 1-5, Unless otherwise indicated, the storage container 500 is substantially similar to the storage container 300 shown in FIGS. 11 and 12.

In this embodiment, the storage container 500 includes a plurality of sidewall extensions 502 that extend from the sidewall 208 adjacent to the base 206 of the storage container 500. The storage container 500 also includes two angled surfaces 504 that extend between the base 206 and the sidewall 208 at opposing ends of the base 206. Each sidewall extension 502 includes a grommet 508 coupled through a hole in the respective sidewall extension 502. The grommets 508 function as the mechanical coupler 306 for coupling the storage container 500 to the frame 114 on the UAV body 106.

In the illustrated embodiment, a unique identifier tag 510 is integrated into the fluid coupler 204. Specifically, the identifier tag 510 is integrated into a threaded portion 512 of the fluid coupler 204 that threadably couples to the storage container 500. In addition, a tag reader 514 is integrated into the fluid coupler 204. Specifically, the tag reader 514 is integrated into an outlet portion 516 of the fluid coupler 204 that couples to the material dispensing system 112 (e.g., to the inlet 240 of the pump 232).

Figure 17:
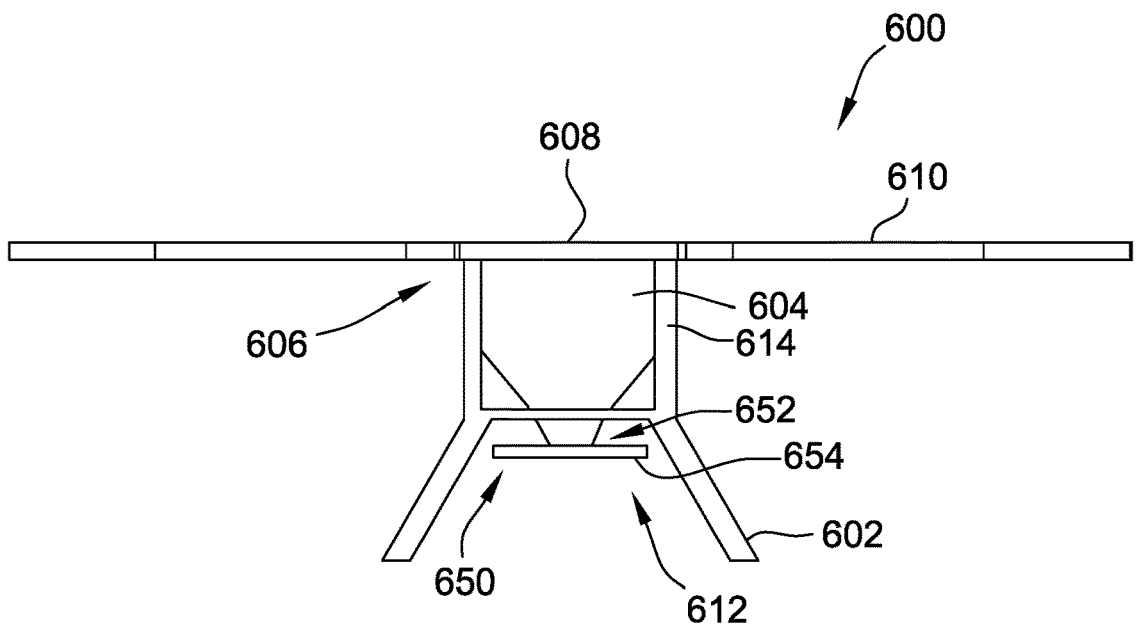
FIG. 17 is a side view of another exemplary aerial material delivery system.
Figure 18:
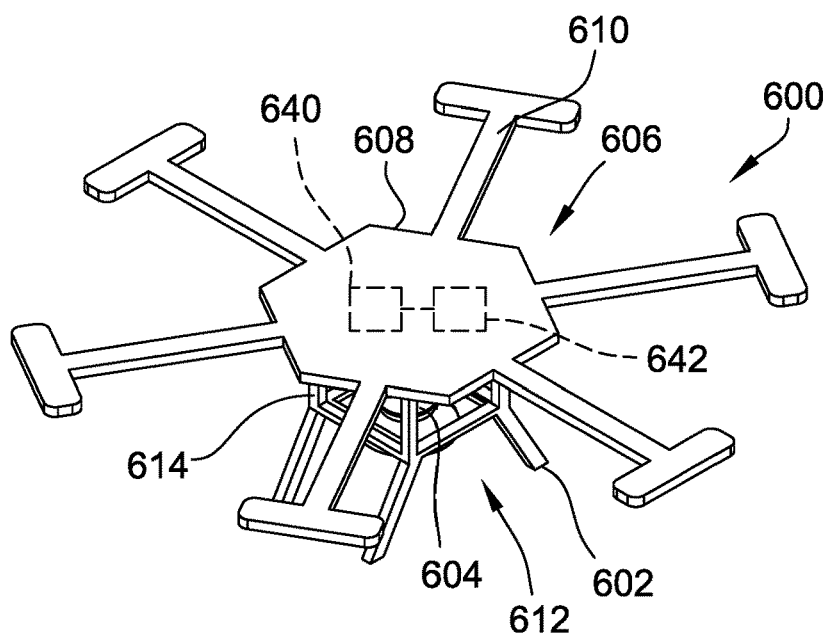
FIG. 18 is a perspective view of the aerial material delivery system in FIG. 17.

FIGS. 17 and 18 illustrate another embodiment of an aerial material delivery system 600 in accordance with the present disclosure. In the example embodiment, the aerial material delivery system 600, like the aerial material delivery system 100 (shown in FIGS. 1-5), is implemented using an unmanned aerial vehicle (UAV) or drone 602, which is similar to the UAV 102 (also shown in FIGS. 1-5). The aerial material delivery system 600 includes the UAV 602 and a flexible storage container 604 mounted thereto. The storage container 604 includes a flowable chemical material contained therein (not shown) to be dispensed using the aerial material delivery system 600.

The UAV 602 includes a body 606 generally defined by a hub 608 and a plurality of spoke-like arms 610. A material dispensing system 612 for dispensing material from the storage container 604 is mounted to the UAV body 606. The material dispensing system 612 may be a liquid material dispensing system or a dry material dispensing system configured to dispense flowable or pourable materials, such as liquids or non-gaseous fluids, granules, and/or powders.

In the example embodiment, the storage container 604 is releasably or removably mounted to the UAV body 606. The aerial material delivery system 600 includes a frame 614 coupled to the UAV body 606 for mounting the storage container 604 to the UAV body 606. The frame 614 may be integral to the UAV body 606 and/or may be releasably coupled thereto. In the example embodiment, the storage container 604 is inserted into the frame 614 to couple the storage container 604 to the UAV body 606.

The UAV 602 also includes a propulsion system (not shown in FIGS. 17 and 18) for generating lift to facilitate flight of the UAV 602, which is substantially similar to the propulsion system 103 (shown in FIG. 1) of the UAV 102. The aerial material delivery system 600 further includes a power source 640 operatively coupled to the UAV body 606 and configured to provide power to the UAV 602 and/or the material dispensing system 612 to perform the functions described herein (e.g., flying, dispensing material, etc.). In the example embodiment, the power source 640, like the power source 140 (shown in FIG. 1) of the UAV 102, includes a battery, which should be understood to include a single battery, multiple batteries, a battery pack, and the like.

In addition, the UAV 602 includes an on-board controller or computer 642 coupled in operative control communication with various components of the aerial material delivery system 100 (e.g., the UAV 602 and the material dispensing system 612) and facilitating various electronic and/or automatic control thereof. The controller 642 is substantially similar to the controller 142 (shown in FIG. 1) of the UAV 102.

In the example embodiment, the material dispensing system 612 is a dry material dispensing system, and includes a spreader 650 for dispensing material from the storage container 604 to a target location (e.g., a field). The spreader 650 is coupled to the storage container 604 using any suitable mechanical connection, such as via a threaded connection, a snap-fit connection, and the like. In FIGS. 17 and 18, the spreader 650 is embodied as a horizontal spreader 652 including a rotatable disk 654. An interior cavity (not shown) of the disk 654 is communicatively coupled to the storage container 604, such that material flows from the storage container 604 into the disk 654. In operation, the disk 654 is rotated (e.g., using a motor, not shown, operated by the control system 642) to dispense material therefrom and onto a target location.

Figure 19:
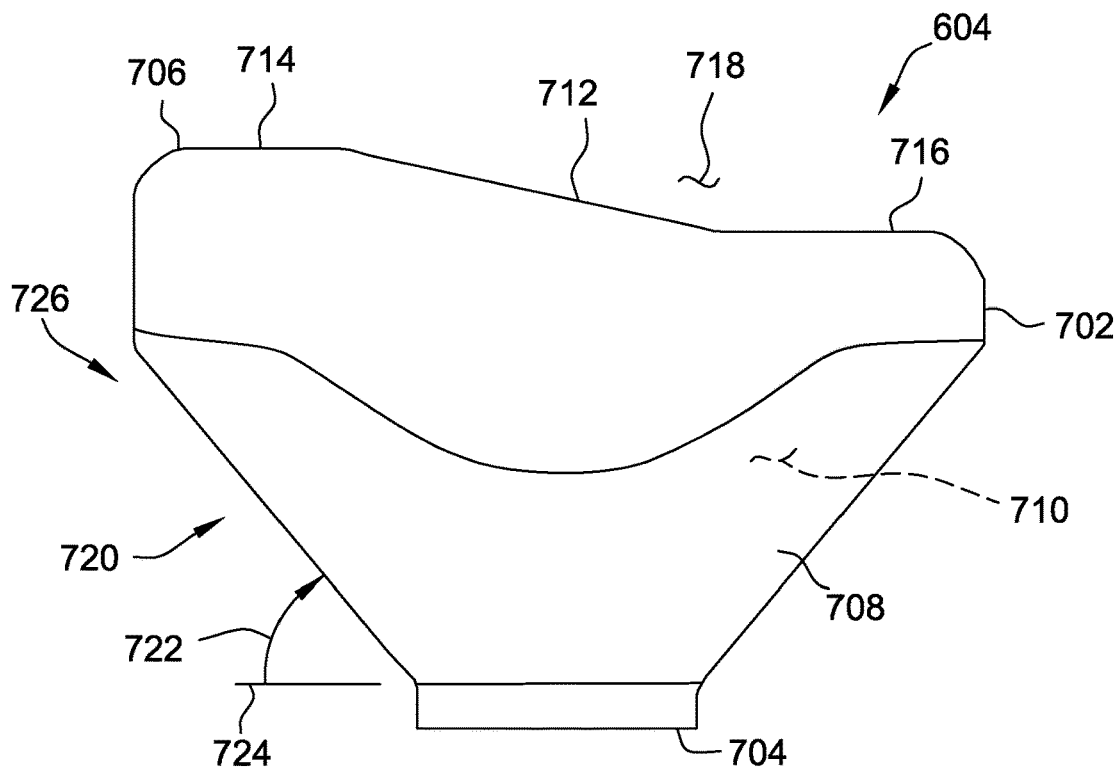
FIG. 19 is a side view of an exemplary storage container suitable for use with the aerial delivery system shown in FIGS. 17 and 18.
Figure 20:
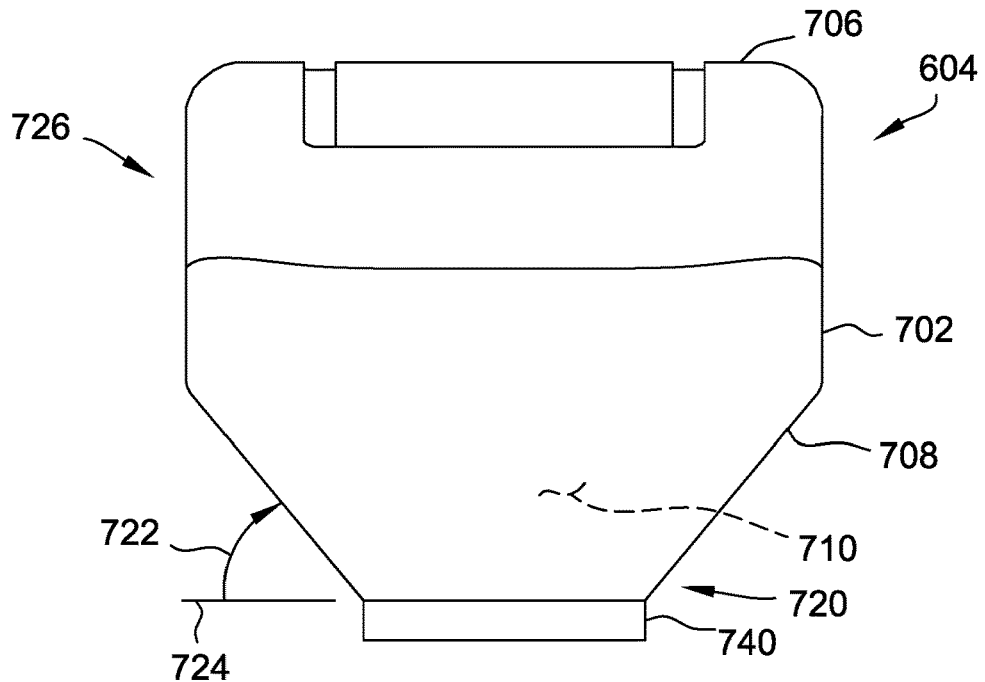
FIG. 20 is another side view of the storage container shown in FIG. 19.

Turning now to FIGS. 19 and 20, the flexible storage container 604 is shown in greater detail. The flexible storage container 604 includes a body 702 and a mouth 704. In the example embodiment, the body 702 of the storage container 604 is thin-walled and constructed of a flexible, deformable material, such as high-density polyethylene (HDPE), low density polyethylene (LDPE), polyester or polyethylene terephthalate (PETE), polycarbonate, bioplastic, and the like. In some embodiments, the body 702 is formed from a thinner or more flexible material than the mouth 704, such that the mouth 704 is more rigid than the body 702. The storage container 604 may be formed from a polymeric resin material (e.g., low linear density resins) using an injection blow-molding process, in at least some embodiments. In these embodiments, the thickness of the body 702 and/or the mouth 704 may be controlled based on an amount of resin material used to form the body 702 and/or the mouth 704. In some embodiments, the storage container 604 may be formed from a laminate and/or film material using a heat-sealing process. Sheets of the laminate and/or film material may be manipulated into the desired shape of the storage container 604 and heat sealed. In these embodiments, the thickness of the body 702 and/or the mouth 704 may be controlled based on a relative thickness of the film/laminate materials) used to form the body 702 and/or the mouth 704.

The body 702 includes a base 706 (e.g., an end of the body 702 opposite the mouth 704) and a sidewall 708. The sidewall 708 may be at least partially translucent or transparent such that the contents of the storage container 604 may be viewed therethrough. Alternatively, the sidewall 708 may be opaque. The base 706 and the sidewall 708 at least partially define a cavity 710 for containing material to be dispensed by the material dispensing system 612. The storage container 604 is configured to contain a flowable chemical product (not shown such as a liquid, flowable granules, or flowable powders.

In the illustrated embodiment, the base 706 includes an angular portion 712 that extends between a first horizontal or non-angled portion 714 and a second horizontal portion 716. The angular portion 712 is angled inwardly (e.g., towards the mouth 704) from the first horizontal portion 714 to the second horizontal portion 716. In this embodiment, the base 706 of the storage container 604 therefore defines a cutout or pocket 718, such that the storage container 604 can accommodate the power source 640, the control system 642, and/or other components of the UAV 602 that are positioned on a bottom of the UAV body 606. In other embodiments, the base 706 may be fully flat or horizontal, or may have any other shape.

In the exemplary embodiment, the storage container 604 tapers from the base 706 towards the mouth 704 to funnel the material within the storage container 604 towards the mouth 704. Specifically, the sidewall 708 includes an angular portion 720 that extends substantially around the entire storage container 604. The angular portion 720 is defines an angle 722 with respect to a horizontal plane 724. The particular angle 722 may be selected to be at least as great as an angle of repose of the material stored in the storage container 604, such that the material will flow from the storage container 604 along the angle 722 under the force of gravity. In some embodiments, the angle 722 is between about 40° and about 60°, or between about 50° and about 60°, or about 55°.

In the example embodiment, the storage container 604 is configured to contain a dry flowable product (e.g., flowable granules or powder). The mouth 704 is a single aperture that functions as both an inlet for receiving the dry flowable product into the storage container 604, and an outlet for supplying the dry flowable product to the material dispensing system 612. In an alternative embodiment, the storage container 604 includes two separate apertures, one of which functions as an inlet and one of which functions as an outlet.

In one embodiment, the storage container 604 is configured to receive material through the mouth 704 in a filling orientation (not shown). In order to dispense material (e.g., flowable granules or powder) from the storage container 604, the storage container 604 is inverted into a dispensing orientation 726, as shown in FIGS. 19 and 20. In the dispensing orientation 726, the storage container 604 is configured to dispense material through the mouth 704. In the example embodiment, as shown in FIGS. 17 and 18, the storage container 604 is mounted to the UAV body 606 and coupled to the material dispensing system 612 in the inverted, dispensing orientation 726, In the inverted, dispensing orientation 726, the dry flowable product is dispensed through the mouth 704 and to the material dispensing system 612 under the force of gravity.

Figure 21:
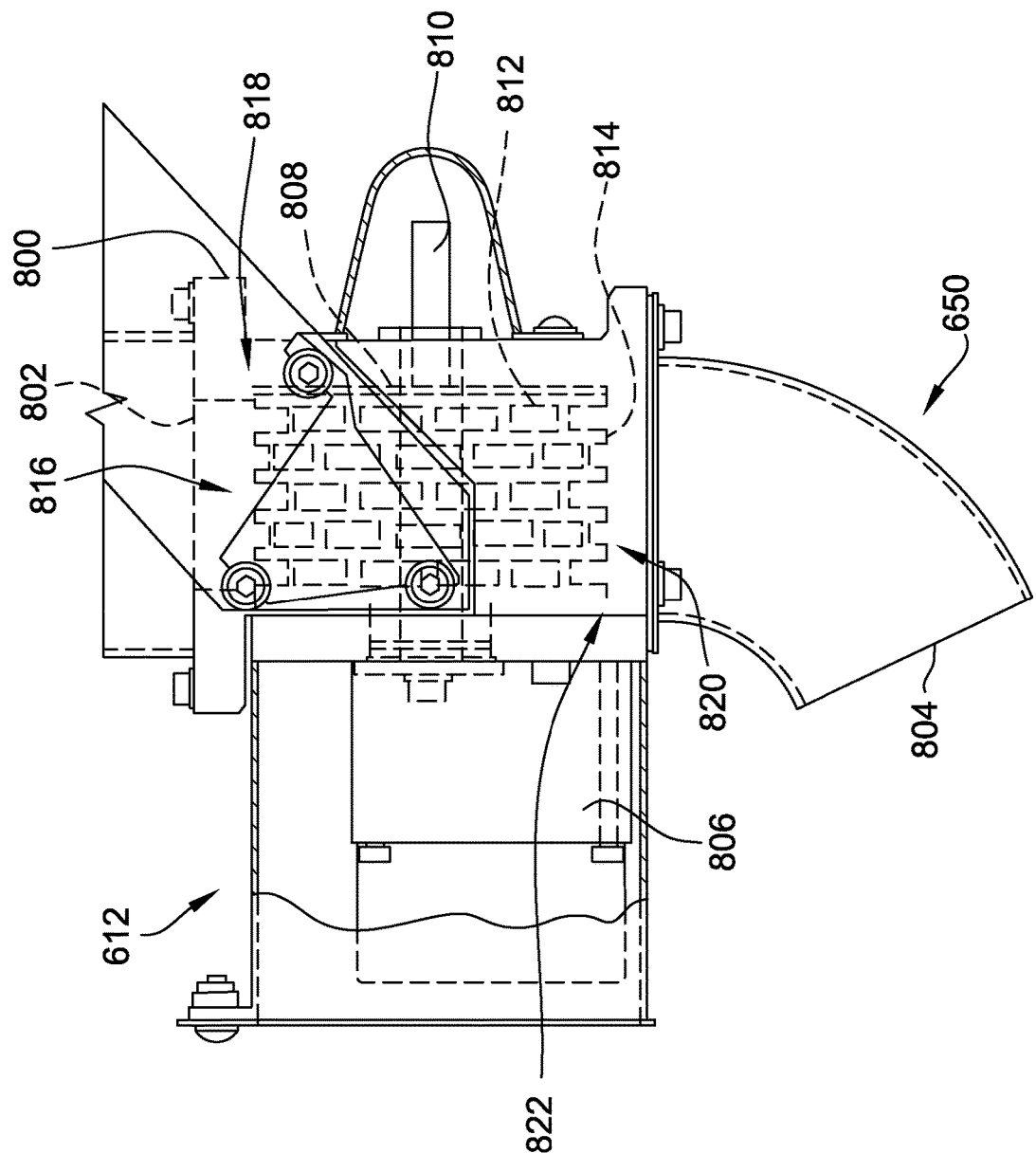
FIG. 21 is a sectional view of an exemplary material dispensing system suitable for use with the aerial delivery system shown in FIGS. 17 and 18.

FIG. 21 illustrates a first exemplary material dispensing system 612 including a spreader 650 embodied as a rotary spreader 800, The rotary spreader 800 includes an inlet 802, an outlet 804, a motor 806, and a rotary dispenser 808 driven by the motor 806 to rotate about a rotation axis 810. The inlet 802 of the rotary spreader 800 is coupled to the mouth 704 of the storage container 604, such that the material within the storage container 604 (e.g., a dry flowable product) will be dispensed from the mouth 704 to the inlet 802. The inlet 802 is communicatively coupled to the outlet 804, such that the material will be further dispensed from the inlet 802 to the outlet 804 and onto a target location.

Figure 22:
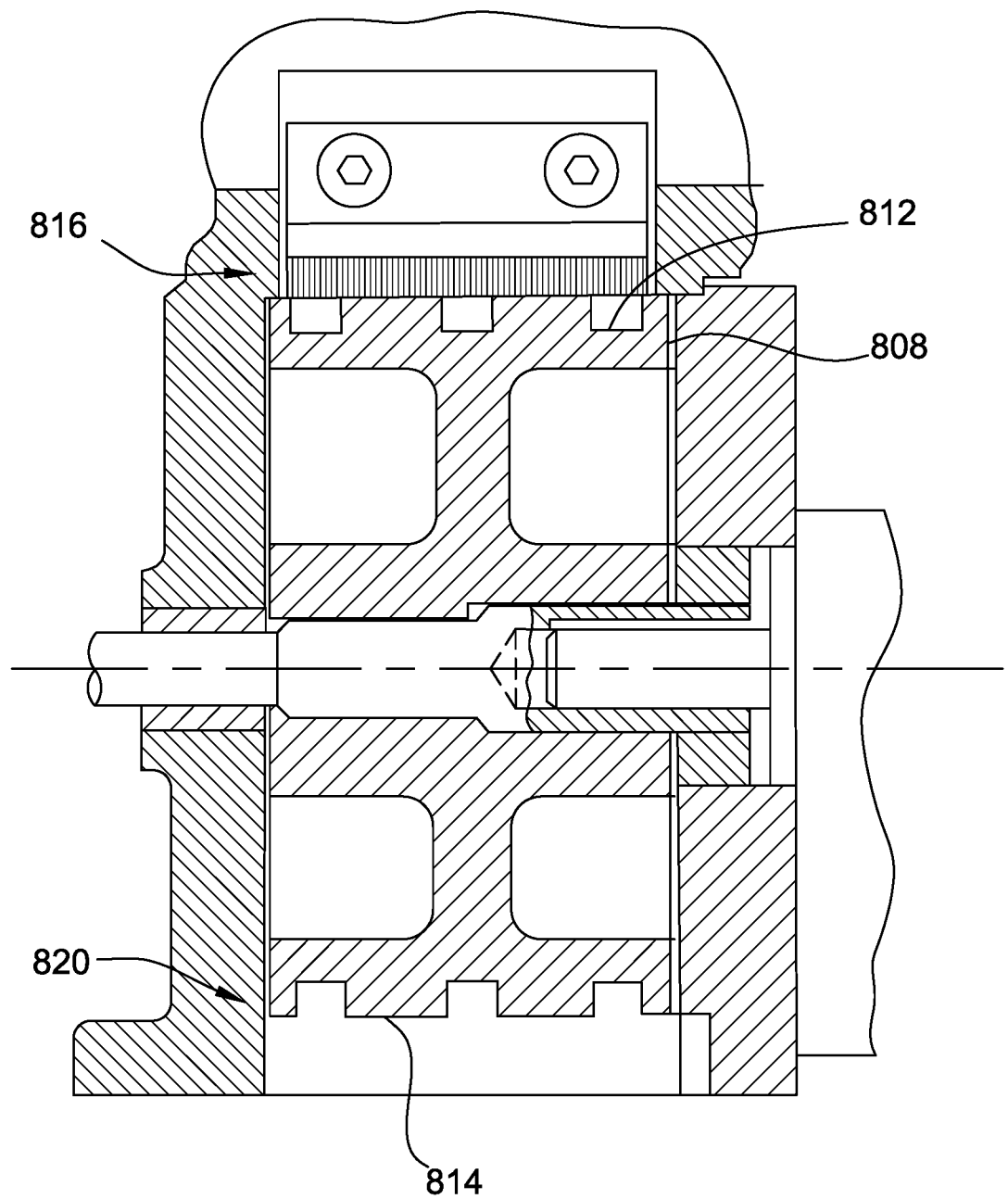
FIG. 22 is an expanded sectional view of a rotary dispenser of the material dispensing system shown in FIG. 21.
Figure 23:
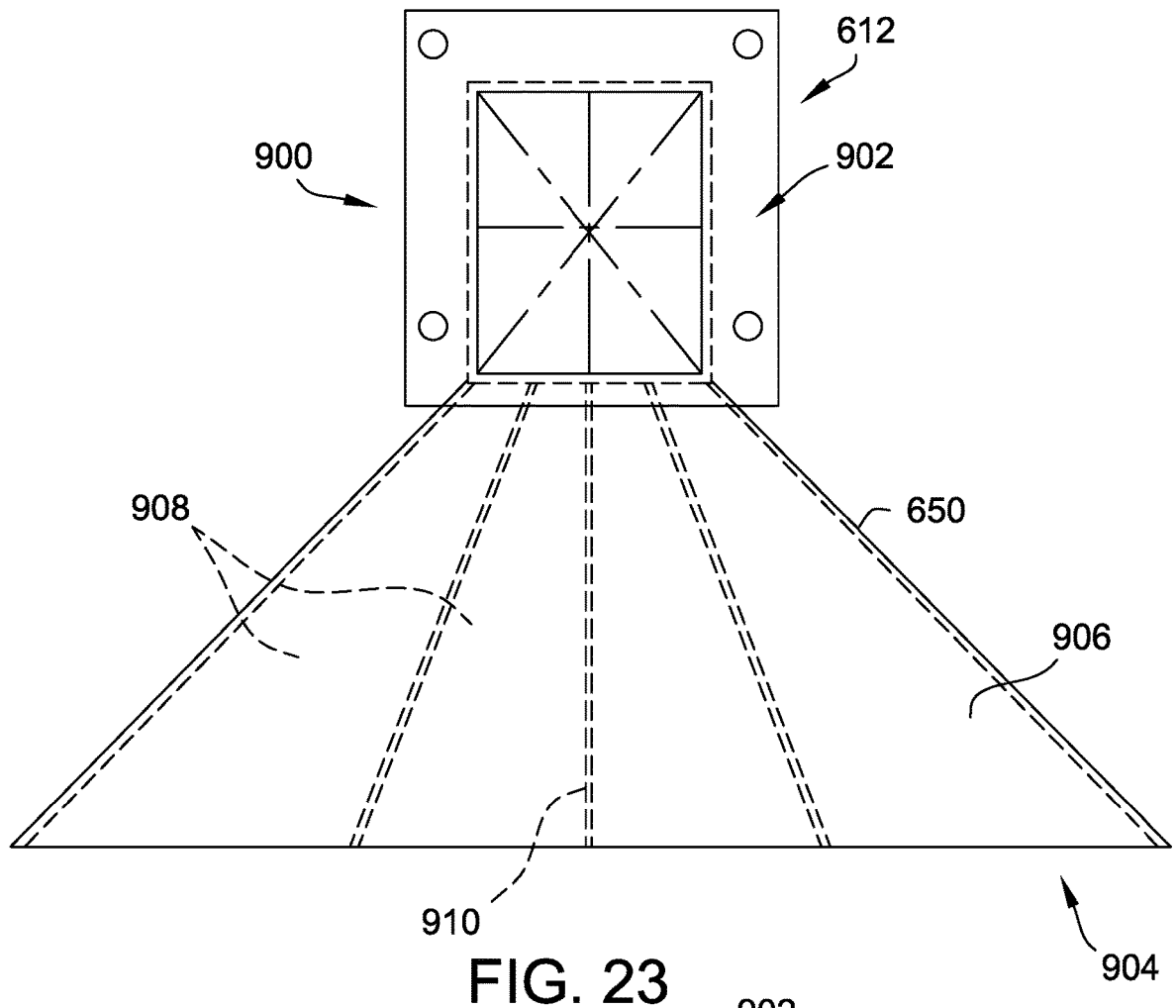
FIG. 23 is a top view of another exemplary material dispensing system suitable for use with the aerial delivery system shown in FIGS. 17 and 18.
Figure 24:
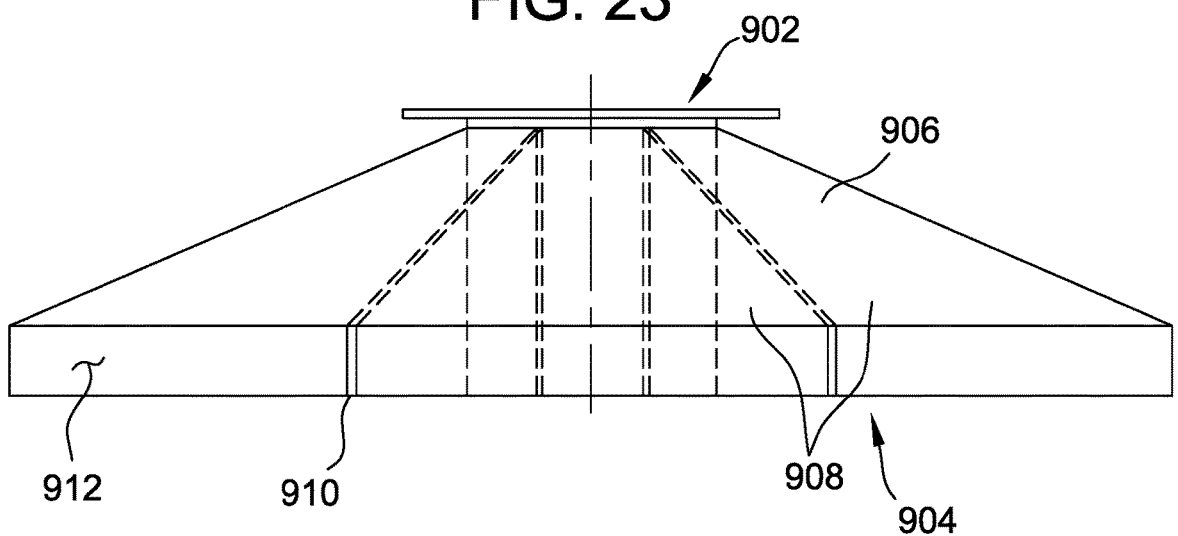
FIG. 24 is an end view of the material dispensing system shown in FIG. 23.
Figure 25:
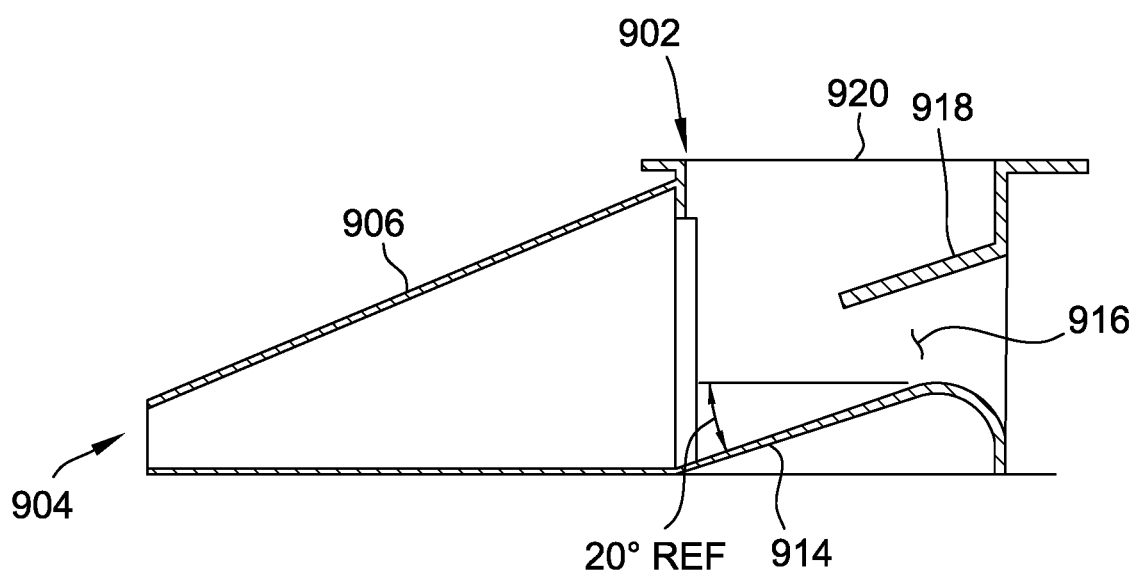
FIG. 25 is a sectional view of the material dispensing system shown in FIGS. 23 and 24.
Figure 28:
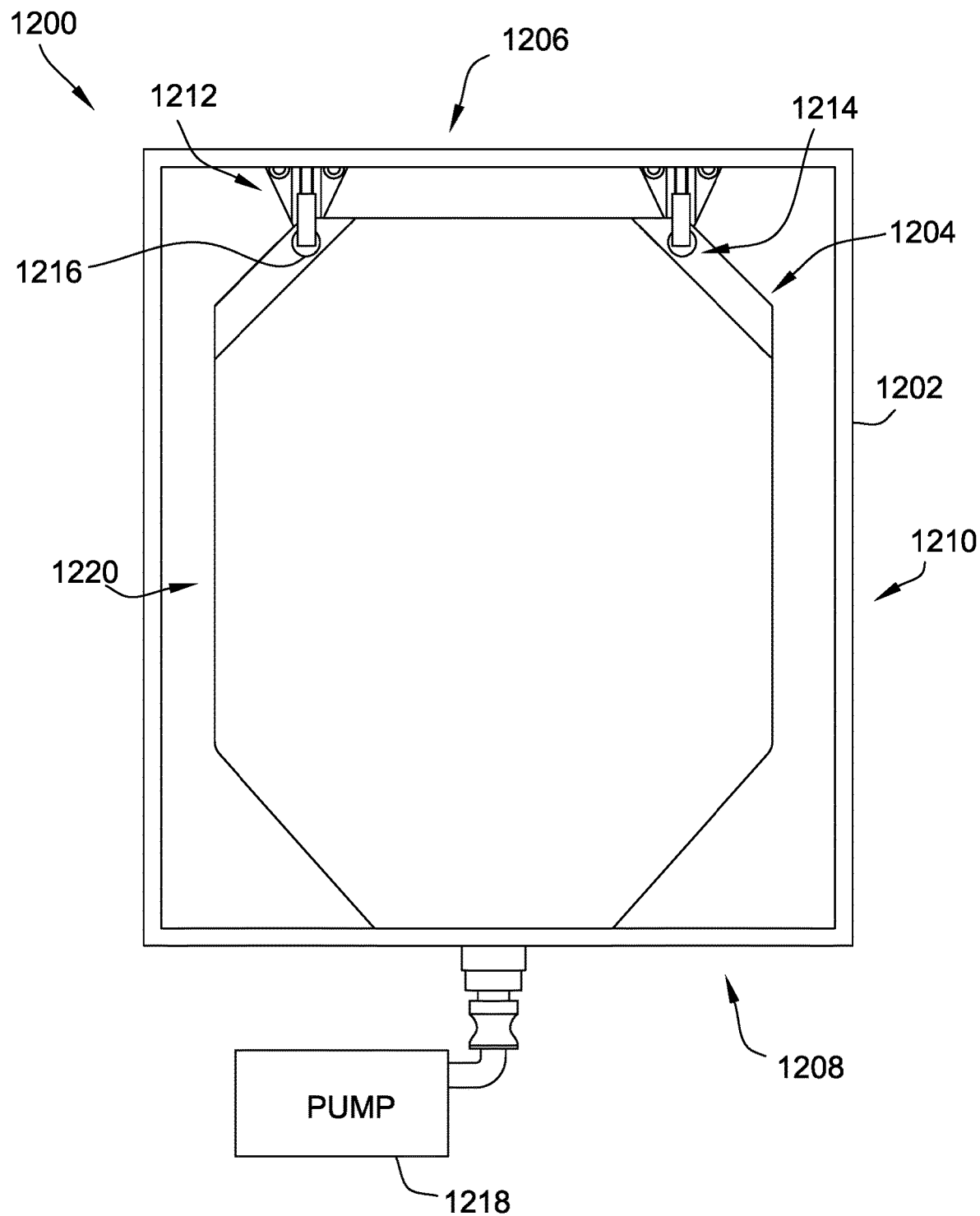
FIG. 28 is a front view of a ground-based material delivery system in accordance with another embodiment of the present disclosure.
Figure 29:
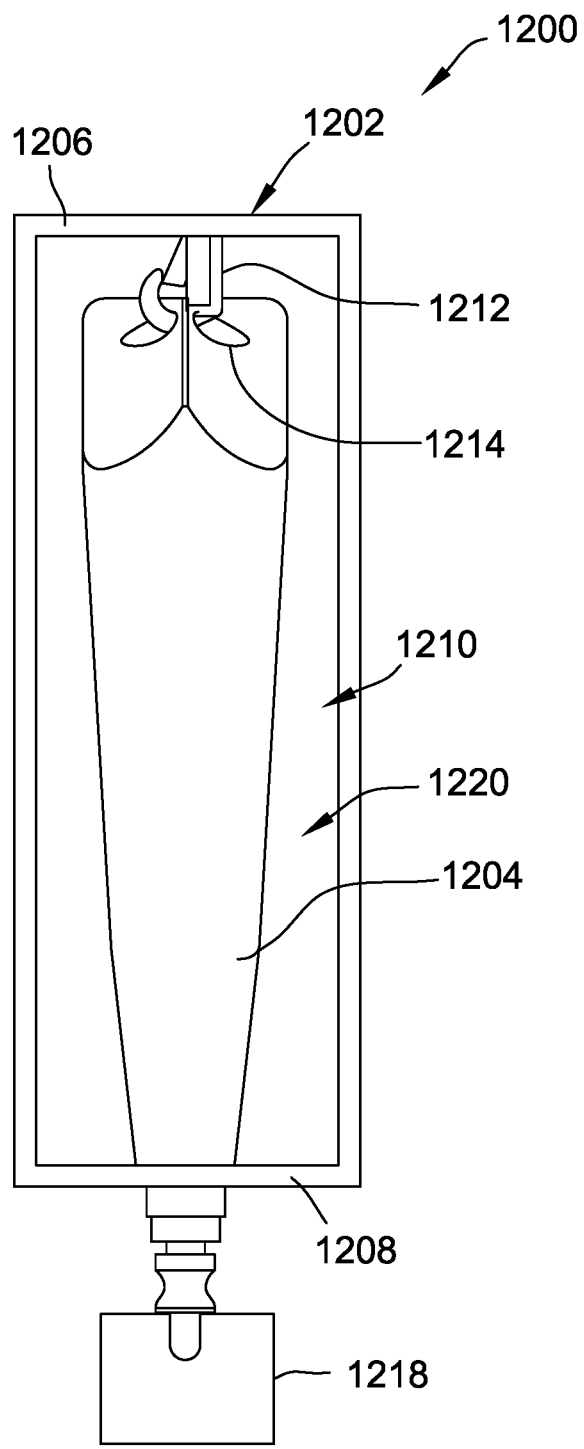
FIG. 29 is a side view of the ground-based material delivery system shown in FIG. 28.
Figure 30:
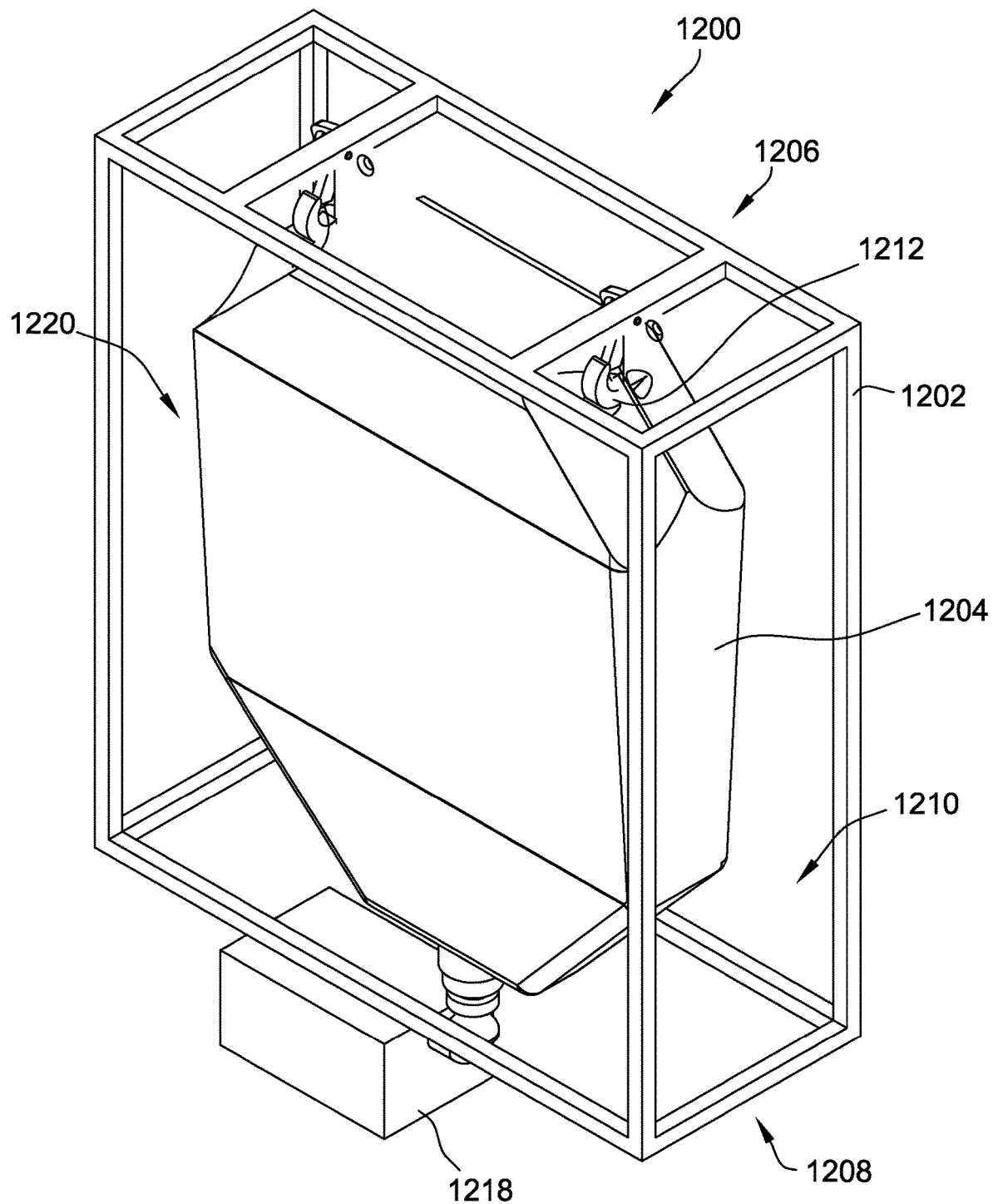
FIG. 30 is a perspective view of the ground-based material delivery system shown in FIGS. 28 and 29.
Figure 31:
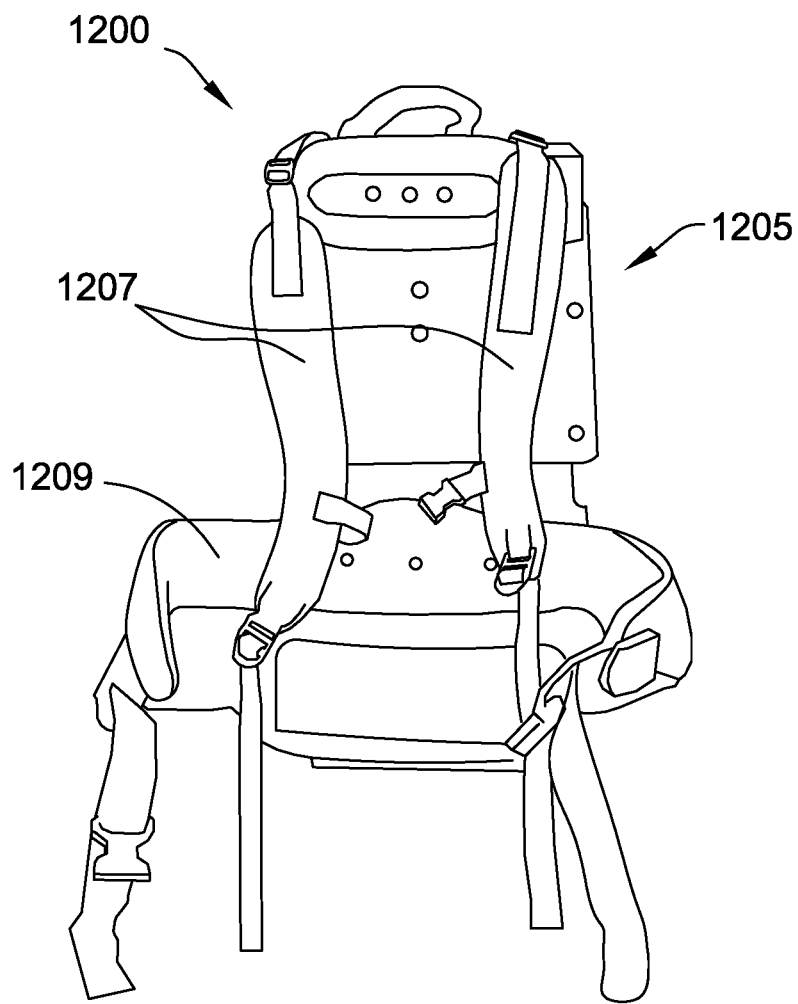
FIG. 31 is a perspective view of the ground-based material delivery system shown in FIGS. 28 and 29 coupled to a backpack assembly.

In the illustrated embodiment, the rotary dispenser 808, shown in more detail in FIG. 22, is positioned between the inlet 802 and the outlet 804 and is configured to control dispensing of the material from the outlet 804. The rotary dispenser 808 includes a plurality of pockets 812 positioned about an outer edge 814 thereof. The pockets 812 are configured to receive material therein as the material is dispensed through the inlet 802, at a first position 816 (corresponding to a top 818 of the rotary dispenser 808). As the motor 806 rotates the rotary dispenser 808, the material contained within the pockets 812 is moved along the outer edge 814 of the rotary dispenser. Once a pocket 812 reaches a second position 820 (corresponding to a bottom 822 of the rotary dispenser 808), the material therein is ejected from the pocket 812 and through the outlet 804. Accordingly, the rotary dispenser 808 controls or meters the amount of material dispensed from the rotary spreader 800, FIGS. 23-25 illustrate another exemplary material dispensing system 612 including a spreader 650 embodied as an air spreader 900. The air spreader 900 includes an inlet 902, an outlet 904, and a channel 906 extending from the inlet 902 to the outlet 904. In the example embodiment, the channel 906 is divided into a plurality of sub-channels 908 by a plurality of walls or fins 910. The outlet 904 is likewise divided into a respective plurality of sub-outlets 912. The channel 906 is partially defined by a bottom wall 914 that is angled upwardly from the outlet 904 to the inlet 902. The bottom wall 914 partially defines a ram-air inlet 916 configured to draw air therethrough and into the sub-channels 908. The bottom wall 914 may be selectively movable to increase or decrease an area of the ram-air inlet 916. The rain-air 916 is further defined by an angled inlet wall 918.

The inlet 902 of the air spreader 900 is coupled to the mouth 704 of the storage container 604, such that material (e.g., dry flowable product) may flow from the storage container 604 to the air spreader 900. In the illustrated embodiment, the inlet 902 includes a gate 920 that may be selectively opened and closed to initiate or terminate dispensing of material from the storage container 604 to the air spreader 900. In operation, the gate 920 is opened to allow material to flow through the inlet 902. Air is drawn through the ram-air inlet 916 as the UAV flies in a forward direction, causing a venturi effect that generates a relatively low pressure area adjacent the inlet 902 to facilitate the flow of material from the storage container 604 into the air spreader 900. Air received through the ram-air inlet 916 further facilitates controlling the distribution and dispensing of material through the sub-channels 908.

With reference now to FIG. 26, a flow diagram of a method 1000 of using or operating the aerial material delivery system 100 shown in FIGS. 1-5 is illustrated. In some embodiments, the method 1000, including one or more steps thereof, may apply to the aerial material delivery system shown in FIGS. 17 and 18. The method 1000 includes providing 1002 a collapsible storage container that contains a flowable chemical product. The storage container includes at least one coupler. The method 1000 also includes releasably mounting 1004 the storage container to an unmanned aerial vehicle (UAV), and coupling 1006 the storage container to a material dispensing system mounted to the UAV using the at least one coupler. The method 1000 also includes dispensing 1008 the flowable chemical product from the UAV using the material dispensing system.

In some embodiments, mounting 1004 includes releasably mounting 1004 the storage container to the UAV using a frame coupled to a body of the UAV. The method 1000 may further include removably coupling the frame to the UAV body.

In some embodiments, dispensing 1008 includes operating the UAV such that the UAV flies over a field, and dispensing 1008 the flowable chemical product from the UAV while the UAV is flying over the field such that the flowable chemical product is applied to the field.

FIG. 27 illustrates another method 1100 of using or operating the aerial material delivery system 100 shown in FIGS. 1-5. In some embodiments, the method 1100, including one or more steps thereof, may apply to the aerial material delivery system shown in FIGS. 17 and 18. The method 1100 includes introducing 1102 a liquid into a collapsible liquid storage container that contains a pre-dosed amount of a chemical product to form a liquid mixture. The liquid storage container includes at least one fluid coupler. The method 1100 also includes releasably mounting 1104 the liquid storage container to an unmanned aerial vehicle (UAV), and fluidly coupling 1106 the liquid storage container to a liquid, dispensing system mounted to the UAV using the at least one fluid coupler. The method 1100 further includes dispensing 1108 the liquid mixture from the UAV using the liquid dispensing system.

In some embodiments, introducing 1102 includes filling the collapsible liquid storage container to a fill line indicator that corresponds to a liquid filling level of the liquid container needed to achieve a pre-determined concentration of the liquid mixture.

In some embodiments, the at least one fluid coupler includes a single fluid coupler, and introducing 1102 includes introducing 1102 the liquid into the liquid storage container via the fluid coupler. Coupling 1106 may include fluidly coupling the liquid storage container to the liquid dispensing system via the same fluid coupler.

In some embodiments, mounting 1104 includes releasably mounting 1104 the liquid storage container to the UAV using a frame coupled to a body of the UAV. The method 1100 may further include removably coupling the frame to the UAV body.

In some embodiments, dispensing 1108 includes operating the UAV such that the UAV flies over a field, and dispensing 1108 the liquid mixture from the UAV while the UAV is flying over the field such that the liquid mixture is applied to the field.

It should be understood that the embodiments and methods described herein are not limited to aerial material delivery systems. For example, features and components of the material delivery systems described herein may be used with or otherwise implemented on ground-based material delivery systems, such as backpack-based material delivery systems.

FIGS. 28-31 illustrate one exemplary embodiment of a ground-based material delivery system 1200 in accordance with another embodiment of the present disclosure. In the example embodiment, the ground based material delivery system 1200 includes a frame 1202 and a collapsible storage container 1204 mounted thereto. The frame 1202 is coupled to a backpack assembly 1205 (broadly, a wearable or human-portable carrying device, shown in FIG. 31) that includes at least one shoulder strap 1207 such that the ground-based material delivery system 1200 may be carried and operated by a human operator. In the illustrated embodiment, the backpack assembly 1205 includes a pair of shoulder straps 1207 and a waist belt 1209 for securing the backpack assembly 1205 to the torso of a user, although the backpack assembly 1205 may have any other suitable configuration that enables the ground-based delivery system 1200 to function as described herein. In other embodiments, for example, the backpack assembly 1205 may include a single shoulder strap 1207 and/or may not include a waist belt 1209.

The storage container 1204 includes a flowable chemical material contained therein (not shown) to be dispensed using the ground-based material delivery system 1200. The storage container 1204 may be substantially similar to the storage container 104 shown in FIGS. 1-16 and/or the storage container 604 shown in FIGS. 17-20.

In the example embodiment, the storage container 1204 is releasably or removably mounted to the frame 1202. In the example embodiment, the frame 1202 has a top 1206, a bottom 1208, and a plurality of sides 1210 extending between the top 1206 and the bottom 1208. The frame top 1206 provides a mounting location for the storage container 1204 such that the storage container 1204 can be suspended from the frame 1202. In some embodiments, the frame 1202 includes one or more mechanical couplers 1212 for coupling the storage container 1204 thereto. For example, the frame 1202 includes hooks (e.g., a pair of hooks) coupled to the frame top 1206 and configured to receive the storage container 1204. The frame may include any suitable mechanical coupler(s) 1212 coupled to any part of the frame 1202, such as snaps, buttons, bolts, and like. Moreover, the frame 1202 may include one or more holes therein that function as the mechanical coupler(s) 1212 (e.g., to receive hooks and the like). In the example embodiment, the storage container includes at least one mechanical coupler 1214 configured for releasable coupling to the frame 1202. The at least one mechanical coupler 1214 of the storage container 1204 may include, for example and without limitation, grommets, hooks, buttons, snaps, clips, clamps, and/or bolts. In the example embodiment, the mechanical coupler 1214 includes a pair of grommets 1216 configured for coupling to the mechanical coupler 1212 (e.g., the pair of hooks) on the frame 1202.

A material dispensing system (not specifically shown) for dispensing material from the storage container 1204 is coupled to the backpack assembly 1205 and the storage container 1204. The material dispensing system may be a liquid material dispensing system or a dry material dispensing system configured to dispense flowable or pourable materials, such as liquids or non-gaseous fluids, granules, and/or powders. The material dispensing system may be similar to the liquid material dispensing system 112 (shown in FIGS. 1-5) and/or may be similar to the dry material dispensing system(s) 612 (shown in FIGS. 17, 18, and 21-25). Therefore, although a pump 1218 is shown coupled to the storage container 1204 as part of a material dispensing system, it should be readily understood that a pump may not be required for certain implementations of the material dispensing system. Additionally or alternatively, the material dispensing system may include one or more handheld wands, applicators, or small booms, for manual application of the material.

The storage container 1204 is releasably mountable to the frame 1202. When the storage container 1204 is mounted to the frame 1202, the storage container 1204 is in the inverted, dispensing orientation 1220. The material being dispensed from the storage container 1204 is drawn under the force of gravity through the material dispensing system onto a target (e.g., a field).

The chemical and material delivery systems of the present disclosure are suitable for use with a wide variety of chemical products including, for example and without limitation, agrochemicals, such as fertilizers, insecticides, fungicides, nematocides, bactericides, acaricides, herbicides, herbicide safeners, growth regulators such as insect molting inhibitors and rooting stimulants, chemosterilants, semiochemicals, repellents, attractants, pheromones, feeding stimulants, other biologically active compounds or entomopathogenic bacteria, virus or fungi to form a multicomponent pesticide.

In certain embodiments, the chemical product includes a composition comprising: (a) at least one compound of Formula I or of Formula II, or a combination of the foregoing compounds, and compositions containing them:

Formula I

<chemical structure> wherein n is 0, 1, or 2; or

Formula II

<chemical structure> wherein R is $CH_3$, or $CF_2H$;
or a combination of the foregoing compounds; and
(b) at least one additional pest control agent different from the compound of Formula I or the compound of Formula II.

Embodiments of suitable chemical products that may be used with the chemical and material delivery systems of the present disclosure include, but are not limited to those described below.

Embodiment 1. A compound of Formula I.

Embodiment 2. A compound of Formula I wherein n is 0, 1, or 2.

Embodiment 3. A compound of Formula I wherein n is 0.

Embodiment 4. A compound of Formula I wherein n is 1.

Embodiment 5. A compound of Formula I wherein n is 2.

Embodiment 6. A compound of Formula II wherein R is CH3 or CF2H

Embodiment 7. A compound of Formula II wherein R is CH3.

Embodiment 8. A compound of Formula II wherein R is CF2H.

Embodiment 9. A composition comprising at least one compound according to any one of Embodiments 1-8, or a combination of the foregoing compounds.

Embodiment 10. A composition according to any one of Embodiments 1-9, and at least one additional biologically active compound or pest control agent different from the compound of Formula I or Formula II.

Embodiment 11. A composition according to any one of Embodiments 1-10, and at least one additional component selected from surfactants, solid diluents and liquid diluents.

Embodiment 12. A composition according to any one of Embodiments 1-11, at least one additional biologically active compound or pest control agent, and at least one additional component selected from surfactants, solid diluents and liquid diluents.

Embodiment 13. A composition according to any one of Embodiments 9-12 wherein the compound of Formula I or II is selected from N-[1,1-dimethyl-2-(methylthio)ethyl]-7-fluoro-2-(3-pyridinyl)-2H-indazole-4-carboxamide, N-[1,1-dimethyl-2-(methylsulfinyl)ethyl]-7-fluoro-2-(3-pyridinyl)-2H-indazole-4-carboxamide, N-[1,1-dimethyl-2-(methylsulfonyl)ethyl]-7-fluoro-2-(3-pyridinyl)-2H-indazole-4-carboxamide, N-(1-methylcyclopropyl)-2-(3-pyridinyl)-2H-indazole-4-carboxamide, and N-[1-(difluoromethyl)cyclopropyl]-2-(3-pyridinyl)-2H-indazole-4-carboxamide; or a combination of any of the foregoing compounds.

Embodiment 14. A composition according to any one of Embodiments 9-12 wherein the compound of Formula I or II is selected from N-[1,1-dimethyl-2-(methylthio)ethyl]-7-fluoro-2-(3-pyridinyl)-2H-indazole-4-carboxamide, N-[1,1-dimethyl-2-(methylsulfinyl)ethyl]-7-fluoro-2-(3-pyridinyl)-2H-indazole-4-carboxamide, and N-[1,1-dimethyl-2-(methylsulfonyl)ethyl]-7-fluoro-2-(3-pyridinyl)-2H-indazole-4-carboxamide.

Embodiment 15. A composition according to any one of Embodiments 9-12 wherein the compound of Formula I or II is selected from N-(1-methylcyclopropyl)-2-(3-pyridinyl)-2H-indazole-4-carboxamide, and N-[1-(difluoromethyl)cyclopropyl]-2-(3-pyridinyl)-2H-indazole-4-carboxamide.

Embodiment 16. A composition according to any one of Embodiments 10-15 wherein the pest control compound or agent is selected from an insecticide, fungicide, nematocide, and bactericide, or a combination of the foregoing.

Embodiment 17. A composition according to any one of Embodiments 10-16 wherein the pest control compound or agent is an insecticide.

Embodiment 18. A composition according to any one of Embodiments 10-16 wherein the pest control compound or agent is a fungicide.

Embodiment 17. A composition according to any one of Embodiments 10-16 wherein the pest control compound or agent is a nematocide.

Embodiment 18. A composition according to any one of Embodiments 10-16 wherein the pest control compound or agent is a bactericide.

Embodiment 19. A composition according to any one of Embodiments 10-18 wherein the at least one additional biologically active compound or agent is selected from abamectin, acephate, acequinocyl, acetamiprid, acrinathrin, acynonapyr, aftdopyropen ([[(3S,4R,4aR,6S,6aS,12R,12aS, 12bS)-3-[(cyclopropylcarbonyl)oxy]-1,3,4,4a,5,6,6a,12, 12a,12b-decahydro-6,12-dihydroxy-4,6a,12b-trimethyl-11-oxo-9-(3-pyridinyl)-2H,11H-naphtho[2,1-b]pyrano[3,4-e]pyran-4-yl]methyl cyclopropanecarboxylate), amidoflumet, amitraz, avermectin, azadirachtin, azinphos methyl, berrfuracarb, bensultap, benzpyrinioxan, bifenthrin, kappa-bifenthrin, bifenazate, bistrifluron, borate, broflanilide, buprofezin, cadusafos, carbaryl, carbofuran, cartap, carzol, chlorantraniliprole, chlorfenapyr, chlorfluazuron, chloroprallethrin, chlorpyrifos, chlorpyrifos-e, chlorpyrifos-methyl, chromafenozide, clofentezin, chloroprallethrin, clothianidin, cyantraniliprole, (3-bromo-1-(3-chloro-2-pyridinyl)-N-[4-cyano-2-methyl-6-[(methylamino)carbonyl]phenyl]-1H-pyrazole-5-carboxamide), cyclaniliprole (3-bromo-N-[2-bromo-4-chloro-6-[[(1-cyclopropylethyl)amino]carbonyl]phenyl]-1(3-chloro-2-pyridinyl)-1H-pyrazole-5-carboxamide), cycloprothrin, cycloxaprid ((5S,8R)-1-[(6-chloro-3-pyridinyl)methyl]-2,3,5,6,7,8-hexahydro-9-nitro-5,8-Epoxy-1H-imidazo[1,2-a]azepine), cyenopyrafen, cyflumetofen, cyfluthrin, beta cylluthrin, cyhalodiamide, cyhalothrin, gamma-cyhalothrin, lambda-cyhalothrin, cypermethrin, alpha-cypermethrin, zeta-cypermethrin, cyromazine, deltamethrin, diafenthiuron, diazinon, dicloromesotiaz, dieldrin, diflubenzuron, dimefluthrin, dimehypo, dimethoate, dimpropyridaz, dinotefuran, diofenolan, emamectin, emamectin benzoate, endosulfan, esfenvalerate, ethiprole, etofenprox, epsilon-metofluthrin, etoxazole, fenbutatin oxide, fenitrothion, fenothiocarb, fenoxycarb, fenpropathrin, fenvalerate, fipronil, flometoquin (2-ethyl-3,7-dimethyl-6-[4-(trifluoromethoxy)phenoxy]-4-quinolinyl methyl carbonate), flonicamid, luazaindolizine, flubendiamide, flucythrinate, flufenerim, flufenoxuron, fluknoxystrobin (methyl (αE)-2-[[2-chloro-4-(trifluoromethyl)phenoxy]methyl]-α-(methoxymethylene)benzeneacetate), fluensulfone (5-chloro-2-[(3,4,4-trifluoro-3-buten-1-yl)sulfonyl]thiazole), fluhexafon, fluopyram, flupiprole (1-[2,6-dichloro-4-(trifluoromethyl)phenyl]-5-[(2-methyl-2-propen-1-yl)amino]-4-[(trifluoromethyl)sulfinyl]-1H-pyrazole-3-carbonitrile), flupyradifurone (4-[[(6-chloro-3-pyriydinyl)methyl](2,2-difluoroethylamino]-2(5H)-furanone), flupyrimin, fluvalinate, tau fluvalinate, fluxametamide, fonophos, formetanate, fosthiazate, gamma-cyhalothrin, halofenozide, heptafluthrin ([2,3,5,6-tetrafluoro-4-(methoxymethyl)phenyl]methyl 2,2-dimethyl-3-[(1Z)-3,3,3-trifluoro-1-propen-1-yl]cyclopropanecarboxylate), hexaflumuron, hexythiazox, hydramethylnon, imidacloprid, indoxacarb, insecticidal soaps, isofenphos, isocycloseram, kappa-tefluthrin, lambda-cyhalothrin, lufenuron, malathion, meperfluthrin ([2,3,5,6-tetrafluoro-4-(methoxymethyl)phenyl]methyl (1R,3S)-3-(2,2-dichloroethenyl)-2,2-dimethylcyclopropanecarboxylate), metaflumizone, metaldehyde, methamidophos, methidathion, methiocarb, methomyl, methoprene, methoxychlor, metofluthrin, methoxyfenozide, epsilon-metofluthrin, epsilon-momfluorothrin, monocrotophos, monofluorothrin ([2, 3,5,6-tetrafluoro-4-(methoxymethyl)phenyl]methyl 3-(2-cyano-1-propen-1-yl)-2,2-dimethylcyclopropanecarboxylate), nicotine, nitenpyram, nithiazine, novaluron, noviflumuron, oxamyl, oxazosulfyl, parathion, parathion methyl, permethrin, phorate, phosalone, phosmet, phosphamidon, pirimicarb, profenofos, profluthrin, propargite, protrifenbute, pyflubumide (1,3,5-trimethyl-N-(2-methyl-1-oxopropyl)-N-[3-(2-methylpropyl)-4-[2,2,2-trifluoro-1-methoxy-1-(trifluoromethyl)ethyl]phenyl]-1-pyrazole-4-carboxamide), pymetrozine, pyrafluprole, pyrethrin, pyridaben, pyridalyl, pyrifluquinazon, pyriminostrobin (methyl (αE)-2-[[[2-[(2,4-dichlorophenyl)amino]-6-(trifluoromethyl)-4-pyrimidinyl]oxy]methyl]-α-(methoxymethylene)benzeneacetate), pyriprole, pyriproxyfen, rotenone, ryanodine, silafluofen, spinetoram, spinosad, spirodiclofen, spiromesifen, spiropidion, spirotetramat, sulprofos, sulfoxaflor (N-[methyloxido[1-[6-(trifluoromethyl)-3-pyridinyl]ethyl]-λ4-sulfanylidene]cyanamide), tebufenozide, tebufenpyrad, teflubenzuron, tefluthrin, kappa-tefluthrin, terbufos, tetrachlorantraniliprole, tetrachlorvinphos, tetramethrin, tetramethylfluthrin ([2,3,5,6-tetrafluoro-4-(methoxymethyl)phenyl]methyl 2,2,3,3-tetramethylcyclopropanecarboxylate), tetranfliprole, thiacloprid, thiamethoxam, thiodicarb, thiosultap-sodium, tioxazafen (3-phenyl-5-(2-thienyl)-1,2,4-oxadiazole), tolfenpyrad, tralomethrin, triazamate, trichlorfon, triflumezopyrim (2,4-dioxo-1-(5-pyrimidinylmethyl)-3-[3-(trifluoromethyl)phenyl]-2H-pyrido[1,2-a]pyrimidinium inner salt), triflumuron, tyclopyrazoflor, zeta-cypermethrin, *Bacillus thuringiensis* delta-endotoxins, entomopathogenic bacteria, entomopathogenic viruses, and entomopathogenic fungi.

Embodiment 20. A composition according to any one of Embodiments 10-19 wherein the at least one additional biologically active compound or pest control agent is selected from additional biologically active pest control compound or agent, wherein the at least one additional biologically active compound or agent is selected from cyantraniliprole, acetamiprid, imidacloprid, spirotetramat, chlorantraniliprole, bifenthrin, or indoxacarb. Avermectin, *Bacillus* spp., any active crystal proteins thereof, Buprofezin, Carbofuran, Chlorfenapyr, Chlorpyrifos, Clothianidin, Cyromazine, Diafenthiuron, Dinotefuran, Emamectin Benzoate, Fipronil, Flonicamid, Flupyradifurone, methomyl (Lannate®), Methoxyfenozide, Novaluron, Permethrin, Pyriproxifen, Sulfoxaflor, Thiamethoxam, γ-Cyhalothrin, or ζ-cypemethrin, broflanilide, dinipropyridaz, isocycloseram, tetrachlorantraniliprole, oxazosulfyl, tyclopyrazoflor, flupyrimin, spiropidion, acynonapyr, benzpyrimoxan, chloroprallethrin, epsilon-metofluthrin, kappa bifenthrin, dicloroniezotiaz, and kappa-tefluthrin.

Embodiment 21. A composition according to any one of Embodiments 10-20 wherein the at least one additional biologically active compound or agent is selected from cyantraniliprole, acetamiprid, spirotetramat, chlorantraniliprole, bifenthrin, and indoxacarb.

Embodiment 22. A composition according to any one of Embodiments 10-21 wherein the compound of Formula I or Formula II is N-[1,1-dimethyl-2-(methylthio)ethyl]-7-fluoro-2-(3-pyridinyl)-2H-indazole-4-carboxamide and wherein the at least one additional biologically active compound or pest control agent is at least one selected from cyantraniliprole, acetamiprid, imidacloprid, spirotetramat, chlorantraniliprole, bifenthrin, and indoxacarb.

Embodiment 23. A composition according to any one of Embodiments 10-21 wherein the compound of Formula I or Formula II is N-[1,1-dimethyl-2-(methylsulfinyl)ethyl]-7-fluoro-2-(3-pyridinyl)-2H-indazole-4-carboxamide and wherein the at least one additional biologically active compound or pest control agent is at least one selected from cyantraniliprole, acetamiprid, imidacloprid, spirotetramat, chlorantraniliprole, bifenthrin, and indoxacarb.

Embodiment 24. A composition according to any one of Embodiments 10-21 wherein the compound of Formula I or Formula II is N-[1,1-dimethyl-2-(methylsulfonyl)ethyl]-7-fluoro-2-(3-pyridinyl)-2H-indazole-4-carboxamide and wherein the at least one additional biologically active compound or pest control agent is at least one selected from cyantraniliprole, acetamiprid, imidacloprid, spirotetramat, chlorantraniliprole, bifenthrin, and indoxacarb.

Embodiment 25. A composition according to any one of Embodiments 10-21 wherein the compound of Formula I or Formula II is N-(1-methylcyclopropyl)-2-(3-pyridinyl)-2H-indazole-4-carboxamide and wherein the at least one additional biologically active compound or pest control agent is at least one selected from cyantraniliprole, acetamiprid, spirotetramat, chlorantraniliprole, bifenthrin, and indoxacarb.

Embodiment 26. A composition according to any one of Embodiments 10-21 wherein the compound of Formula I or Formula II is N-[1-(difluoromethyl)cyclopropyl]-2-(3-pyridinyl)-2H-indazole-4-carboxamide and wherein the at least one additional biologically active compound or pest control agent is at least one selected from cyantraniliprole, acetamiprid, imidacloprid, spirotetramat, chlorantraniliprole, bifenthrin, and indoxacarb.

Embodiment 27. A composition according to any one of Embodiments 10-26 wherein the weight ratio of the compound of Formula I or the compound of Formula II to the at least one additional biologically active compound or pest control agent component, is from 10000:1 to 1:50.

Embodiment 28. A composition according to any one of Embodiments 10-26 wherein the weight ratio of the compound of Formula I or the compound of Formula II to the at least one additional biologically active compound or pest control agent component, is from 100:1 to 1:10.

Embodiment 29. A composition according to any one of Embodiments 10-26 wherein the weight ratio of the compound of Formula I or the compound of Formula II to the at least one additional biologically active compound or pest control agent component, is from 1:50 to 5:1.

Embodiment 30. A composition according to any one of Embodiments 9-29 further comprising at least one additional component selected from surfactants, solid diluents, and liquid diluents.

Embodiment 31. A composition according to any one of Embodiments 9-30 further comprising a liquid fertilizer.

Embodiment 32. A composition according to Embodiment 31 wherein the liquid fertilizer is aqueous-based.

Embodiment 33. A soil drench formulation comprising the composition of any one of Embodiments 9-32.

Embodiment 34. A spray composition comprising the composition of any one of Embodiments 9-32.

Embodiment 35. A bait composition comprising the composition of any one of Embodiments 9-32.

Embodiment 36. A bait composition according to Embodiment 35 further comprising one or more food materials.

Embodiment 37. A bait composition according to Embodiment 35 or 36 further comprising an attractant.

Embodiment 38. A bait composition according to any one of Embodiments 35-37 further comprising a humectant.

Embodiment 39. A composition according to any one of Embodiments 9-30 wherein the composition is a solid composition selected from dusts, powders, granules, pellets, prills, pastilles, tablets, and filled films.

Embodiment 40. A composition according to Embodiment 39 wherein the solid composition is water-dispersible or water-soluble.

Embodiment 41. A liquid or dry formulation comprising the composition of any one of Embodiments 9-32, or 39-40 for use in a drip irrigation system or furrow during planting.

Embodiment 42. A treated seed comprising the composition of any one of Embodiments 9-32, or 39-40 in an amount of from about 0.0001 to 1% by weight of the seed before treatment.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to illustrate the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An aerial fluid delivery system comprising:
   an unmanned aerial vehicle (UAV) comprising a body;
   a material dispensing system mounted to the UAV; and
   a collapsible storage container releasably mountable to the UAV, characterized in:
   the liquid storage container containing a pre-dosed amount of a chemical product and comprising at least one fluid coupler, the liquid storage container configured to receive a liquid via the at least one fluid coupler to form a liquid mixture with the chemical product, wherein the at least one fluid coupler is adapted to fluidly couple the liquid storage container to the liquid dispensing system of the UAV for dispensing the liquid mixture therethrough;
   wherein the at least one fluid coupler comprises a single fluid coupler that functions as both an inlet for receiving liquid into the liquid storage container to mix with the chemical product and form the liquid mixture, and an outlet for supplying the liquid mixture to the liquid dispensing system.

2. The aerial fluid delivery system of claim 1, wherein the liquid storage container includes a fill line indicator that corresponds to a liquid filling level of the liquid container needed to achieve a pre-determined concentration of the liquid mixture; and/or wherein the liquid storage container is constructed from at least one of a transparent material and a translucent material.

3. The aerial fluid delivery system of claim 2, wherein the liquid storage container comprises a bag including at least sidewall constructed of a flexible film.

4. The aerial fluid delivery system of claim 3, wherein the liquid storage container is constructed from at least one of plastic, polyethylene, modifier rubber, polyethylene terephthalate, nylon, Valéron, and film laminates; and/or
   wherein the flexible film has a thickness from about 3 mil to 6.5 mil; and/or
   wherein the flexible film has an areal density of less than 0.15 g/cm$^2$.

5. The aerial fluid delivery system of claim 4, wherein the liquid storage container comprises a unique identifier tag configured to wirelessly communicate with a controller of the UAV to identify at least one type of the chemical product contained within the liquid storage container and an amount of the chemical product contained within the liquid storage container.

6. The aerial fluid delivery system of claim 5, further comprising a frame coupled to the UAV body, wherein the collapsible storage container is releasably mountable to the UAV by the frame.

7. The aerial chemical delivery system of claim 6, wherein the frame is releasably coupled to the UAV body and/or wherein a bottom of the frame is coupled to a top of the UAV body; and/or wherein, when the liquid storage container is mounted to the UAV by the frame, a top of the liquid storage container is located above a top of the UAV body, and a bottom of the liquid storage container is located below the top of the UAV body.

8. The aerial fluid delivery system of any one of claims 1-7, wherein the chemical product comprises at least one fertilizer, an insecticide, a fungicide, a nematocide, a bactericide, an araricide, a herbicide, a herbicide safener, a growth regulator, a chemosterilant, a semiochemicals, a repellent, an attractant, a pheromone, and a feeding stimulant; and/or wherein the chemical product comprises at least one invertebrate pest control agent.

9. A method characterized by comprising:
   introducing a liquid into a collapsible storage container that contains a predosed amount of a chemical product to form a liquid mixture, the liquid storage container including at least one fluid coupler;
   releasably mounting the liquid storage container to an unmanned aerial vehicle (UAV);
   fluidly coupling the storage container to a liquid dispensing system mounted to the UAV using the at least one fluid coupler; and
   dispensing the liquid mixture from the UAV using the liquid dispensing system; wherein the at least one fluid coupler comprises a single fluid coupler;
   wherein introducing a liquid into the collapsible liquid storage container comprises introducing the liquid into the liquid storage container via the fluid coupler; and
   wherein fluidly coupling the liquid storage container to a liquid dispensing system comprises fluidly coupling the liquid storage container to the liquid dispensing system via the same fluid coupler.

10. The method of claim 9, wherein dispensing the liquid mixture from the UAV comprises:
    operating the UAV such that the UAV flies over a field; and
    dispensing the liquid mixture from the UAV while the UAV is flying over the field such that the liquid mixture is applied to the field.

11. The method of claim 9, wherein releasably mounting the liquid storage container to a UAV comprises releasably mounting the storage container to the UAV using a frame coupled to a body of the UAV.

12. The method of claim 11 further comprising removably coupling the frame to the UAV body.

13. The method of claim 9, wherein introducing a liquid into a collapsible liquid storage container includes filling the collapsible liquid storage container to a fill line indicator that corresponds to a liquid filling level of the liquid container needed to achieve a predetermined concentration of the liquid mixture.

14. A collapsible liquid storage container comprising:
    a flexible sidewall constructed of an ultra-lightweight material, the sidewall at least partially defining a cavity;
    a pre-dosed amount of a chemical product disposed within the cavity;
    at least one mechanical coupler coupled to the sidewall and configured for releasable coupling to an unmanned aerial vehicle (UAV); and
    at least one fluid coupler coupled in fluid communication with the cavity, wherein the liquid storage container is configured to receive a liquid into the cavity via the at least one fluid coupler to form a liquid mixture with the chemical product, and wherein the at least one fluid coupler is adapted to fluidly couple the cavity to a liquid dispensing system of the UAV such that the liquid mixture can be dispensed from the UAV liquid dispensing system.

15. The collapsible liquid storage container of claim 14, wherein the at least one fluid coupler comprises a single fluid coupler that functions as both an inlet for receiving liquid into the liquid storage container to mix with the chemical product and form the liquid mixture, and an outlet for supplying the liquid mixture to the liquid dispensing system.

16. The collapsible liquid storage container of claim 14, further comprising a fill line indicator that corresponds to a liquid filling level of the liquid container needed to achieve a pre-determined concentration of the liquid mixture.

17. The collapsible liquid storage container of claim 14, wherein the at least one mechanical coupler is selected from the group consisting of grommets, hooks, buttons, snaps, clips, clamps, and bolts.

18. The collapsible liquid storage container of claim 14, wherein the collapsible liquid storage container comprises a unique identifier tag configured to wirelessly communicate with a controller of the UAV to identify at least one of a type of the chemical product contained within the liquid storage container and an amount of the chemical product contained within the liquid storage container.

19. The collapsible liquid storage container of claim 14, wherein the chemical product comprises at least one of a fertilizer, an insecticide, a fungicide, a nematocide, a bactericide, an acaricide, a herbicide, a herbicide safener, a growth regulator, a chemosterilant, a semiochemical, a repellent, an attractant, a pheromone, and a feeding stimulant.

* * * * *